(12) United States Patent
Itaya

(10) Patent No.: US 7,980,714 B2
(45) Date of Patent: Jul. 19, 2011

(54) DISPLAY DEVICE

(75) Inventor: Hideki Itaya, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 215 days.

(21) Appl. No.: 12/253,063

(22) Filed: Oct. 16, 2008

(65) Prior Publication Data

US 2009/0103282 A1    Apr. 23, 2009

(30) Foreign Application Priority Data

Oct. 19, 2007   (JP) .................... 2007-272208

(51) Int. Cl.
    *G09F 13/04*   (2006.01)
(52) U.S. Cl. ...... 362/97.1; 362/97.2; 362/253; 362/632; 362/633; 362/634; 349/58; 349/60
(58) Field of Classification Search ........ 362/97.1–97.2, 362/253, 632–634; 349/58, 60
    See application file for complete search history.

(56) References Cited

U.S. PATENT DOCUMENTS

2002/0101399 A1*  8/2002  Kubo et al. ............... 345/104
2006/0290837 A1* 12/2006  Kawamura et al. ......... 349/58

FOREIGN PATENT DOCUMENTS

JP      2007-148048 A      6/2007

* cited by examiner

*Primary Examiner* — Stephen F Husar
*Assistant Examiner* — Meghan K Dunwiddie
(74) *Attorney, Agent, or Firm* — Sughrue Mion, PLLC

(57) ABSTRACT

A display device including a display panel which displays an image and a backlight unit which illuminates a light to the display panel, include the backlight unit with a fixing member fixed on a device casing; a flexible printed circuit substrate which is fixed on the fixing member; and a spacer which is fixed on the flexible printed circuit substrate, wherein the flexible printed circuit substrate in an end part of the display panel is sandwiched between the fixing member and the spacer.

19 Claims, 20 Drawing Sheets

DISPLAY DEVICE

DISPLAY DEVICE

INCORPORATION BY REFERENCE

This application is based upon and claims the benefit of priority from Japanese Patent Application No. 2007-272208, filed on Oct. 19, 2007, the disclosure of which is incorporated herein in its entirety by reference.

TECHNICAL FIELD

The present invention relates to a display device.

BACKGROUND ART

A display device such as a liquid crystal display (LCD) device which illuminates a display panel using a backlight unit is publicly known.

As a backlight unit in such a display device, a side backlight unit (also described an edge light system) is widely used. Hereafter, the side backlight unit is written as the backlight unit.

The backlight unit includes a light source which is arranged close to an end face of a light guide plate. That is, in the backlight unit, a light of the light source enters the light guide plate from the end face thereof. The light which enters the light guide plate is emitted from one surface of the light guide plate toward the display panel.

In the backlight unit, a light emitting diode (LED) is widely used as the light source. Pluralities of LEDs as the light source are mounted on a substrate. A flexible printed circuit (FPC) substrate which is capable of a space-saving design is often used as the substrate. The FPC substrate is fixed to a chassis including a backlight unit using a double-stick tape or the like. The display panel is fixed to the chassis using the double-stick tape like a FPC substrate.

Japanese Patent Application Laid-Open No. 2007-148048 discloses an example of the display device with the above-mentioned backlight unit. FIG. 21 is a perspective view of the display device according to Japanese Patent Application Laid-Open No. 2007-148048, and FIG. 22 is an exploded perspective view thereof. FIG. 23A is a partially sectional view along a C-C line in FIG. 21.

As shown in the drawings, the LED 103 is arranged close to an end face of a light guide plate 111. The LED 103 is mounted on an FPC substrate 102 for a light source. The FPC substrate 102 for the light source is fixed to a chassis 104 using a double-stick tape 114. A polarizer 101a arranged in a display panel 101 is fixed to the FPC substrate 102 for the light source using a double-stick tape 106. Since the FPC substrate 102 for the light source is fixed to the chassis 104, the polarizer 101a is fixed to the chassis 104 via the FPC substrate 102.

In the display device, the LED as a light source for the backlight unit has to be positioned and fixed to the light guide plate 111 with high alignment accuracy, because the LED is a point light source and a plurality of LEDs are used. The plurality of LEDs means not only a plurality of discrete LEDs but also one or more LED arrays having a plurality of LEDs.

When a cold cathode fluorescent lamp (CCFL) which is a linear light source is employed as a light source, a brightness distribution in a longitudinal direction of the CCFL is substantially homogeneous. However, when the LED which is a point light source is used, lights from a plurality of LEDs enter the light guide plate.

Accordingly, for example, when one LED causes a positional displacement to the other LEDs, the positional relationship between this LED and an end face of the light guide plate is different from a positional relationship between the other LEDs and the end face thereof.

Therefore, the brightness distribution of lights entering the light guide plate becomes inhomogeneous due to displacement of the LED.

A design which used the LED positively is performed in order to thin a display device. In this case, thickness of the light guide plate has to be substantially equal to the dimension of the LED which is the dimension of the thickness direction of the light guide plate.

Accordingly, for example, homogeneity of the brightness distribution of the light which is incident into the guide plate deteriorates when the LED shifts in a thickness direction of the light guide plate.

For this reason, it is required that the LED is always arranged in the accurate position in a positional relation between the LED and the light guide plate.

However, the display device mentioned above includes a gap K1 between the display panel 101 and the double-stick tape 106. The position of the LED 103 moves, when external force is applied to the display panel 101 while such a gap K1 exists. Because of the positional displacement of the LED 103, the brightness distribution becomes inhomogeneous.

FIG. 23B is a diagram illustrating such disadvantage. A polarizer 101a stuck on a glass substrate 101b is fixed to an optical sheet including lens sheets 108a and 108b and a diffusion sheet 109a by the double-stick tape 106.

Then, if the external force is applied to the display panel 101, the double-stick tape 106 sticks to a protruding part 101e of the display panel 101.

Therefore, the LED 103 departs from the end face 111a of the light guide plate 111, and the brightness distribution of the light which enters the light guide plate 111 becomes inhomogeneous. Once the double-stick tape 106 sticks to the protruding part 101e, even after the external force is removed, the FPC substrate 102 for the light source does not return to the original position. Thus, the LED 103 still remains in a position which deviates from the optimal position with respect to the end face 111a of the light guide plate 111.

The reason why the double-stick tape 106 sticks to the protruding part 101e of the display panel 101 is described below.

That is, in a configuration shown in FIG. 23A, when the external force is applied toward a chassis 104 from the protruding part 101e of the display panel 101, the protruding part 101e bends toward the chassis 104.

On the other hand, when the external force is applied toward the protruding part 101e from the chassis 104, the chassis 104 is pushed up toward the protruding part 101e.

As in any case gap K1 contracts and it is shown in FIG. 23B, the double-stick tape 106 sticks to the protruding part 101e of display panel 101. Even after the external force is removed, the double-stick tape 106 has stuck to the protruding part 101e.

In order to solve the above-mentioned problem, Japanese Patent Application Laid-Open No. 2007-148048 discloses a display device as shown in FIGS. 24, 25A and 26.

FIG. 24 shows an exploded perspective view of the display device, and FIG. 25A shows a cross-sectional view of the display device corresponding to a portion along a C-C line in FIG. 21. FIG. 26 is a top view of the display device which has arranged a spacer to the backlight unit.

In the display device, a spacer 105 is arranged at a position which opposes the LED 103 and is located between a protruding part 101e of a glass substrate 101b and a double-stick tape 106. A double-stick tape 115 is arranged at a position which is located between a FPC substrate 102 for the light source and the double-stick tape 106, and is closer to an end part 121 of the glass substrate 101b than the spacer 105. Thereby, a gap between the protruding part 101e of the glass substrate 101b and the FPC substrate 102 for the light source is filled in.

However, in the display device mentioned above, when the FPC substrate 102 for the light source is bent so as to cover an end part 104a of the chassis 104 and an end part 102a of the FPC substrate 102 for the light source is fixed to a back face of the chassis 104, the LED 103 deviates from the optimal position with respect to the end face 111a of the light guide plate 111. Since FPC substrate 102 for the light source unsticks from chassis 104 according to the force which tries to return from the bent state to the original flat state, this positional displacement of LED 103 occurs. When the FPC substrate 102 for a light source unsticks from the chassis 104, the LED 103 deviates from the optimal position with respect to the end face 111a of the light guide plate 111.

The positional displacement of the LED 103 causes inhomogeneous brightness distribution of incident lights in the light guide plate 111 and, as a result, deteriorates display quality in the display device.

In the above description, the FPC substrate for the light source is exemplified. However, various bent FPC substrates are employed in the display device. When such FPC substrates peel from fixed positions due to a restorative force, unexpected inconvenience may arise.

SUMMARY

The main object of the present invention is to provide the display device which prevented peeling of FPC effectively.

A display device including a display panel which displays an image and a backlight unit which illuminates a light to the display panel, include the backlight unit with a fixing member fixed on a device casing; a flexible printed circuit substrate which is fixed on the fixing member; and a spacer which is fixed on the flexible printed circuit substrate, wherein the flexible printed circuit substrate in an end part of the display panel is sandwiched between the fixing member and the spacer.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

Figure 25A:
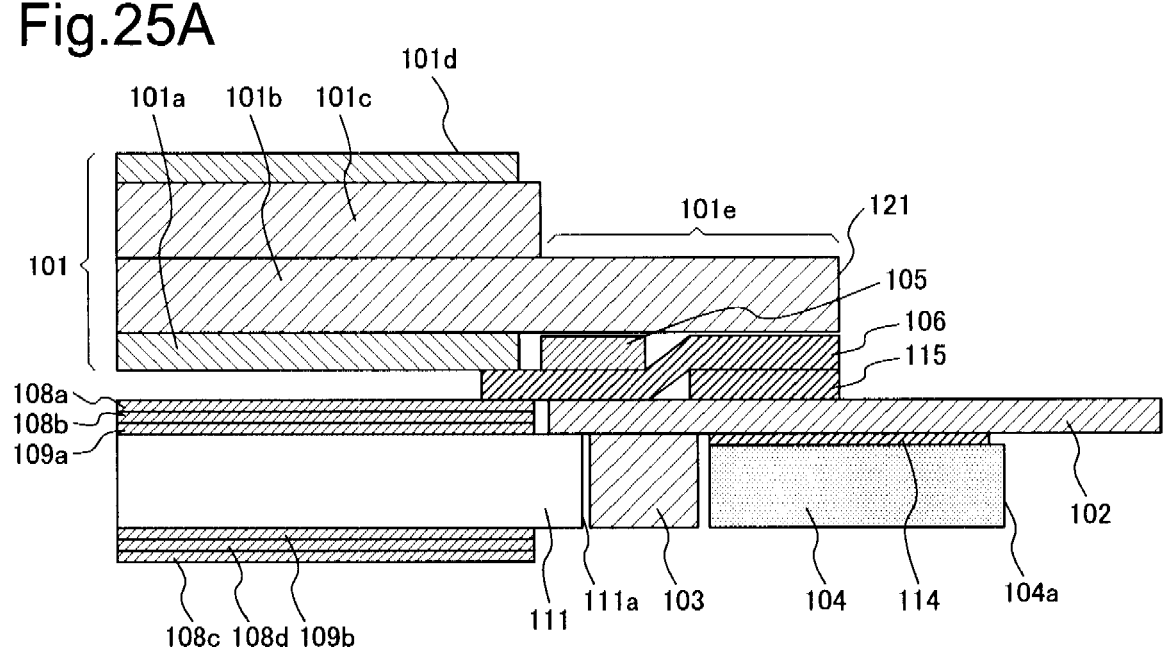
FIG. 25A is a partially sectional view of the display device in the related art.

A related art is described again before describing an exemplary embodiment of the present invention. As shown in FIG. 25A, in Japanese Patent Application Laid-Open No. 2007-148048, the spacer 105 is arranged at a position which opposes the LED 103 and is located between the protruding part 101e of the glass substrate 101b and the double-stick tape 106.

The double-stick tape 115 is located between the FPC substrate 102 for the light source and the double-stick tape 106, and is closer to the end part 121 of the glass substrate 101b than the spacer 105.

Thereby, in the display device disclosed in Japanese Patent Application Laid-Open No. 2007-148048, the gap does not exist between the protruding part 101e of the glass substrate 101b and the FPC substrate 102 for the light source.

However, when the FPC substrate 102 for the light source is bent so as to cover a side part of the chassis 104 and the side part of the FPC substrate 102 for the light source is fixed to the back face of the display device, the LED 103 deviates from the optimal position with respect to the end face of the light guide plate 111.

Figure 25B:
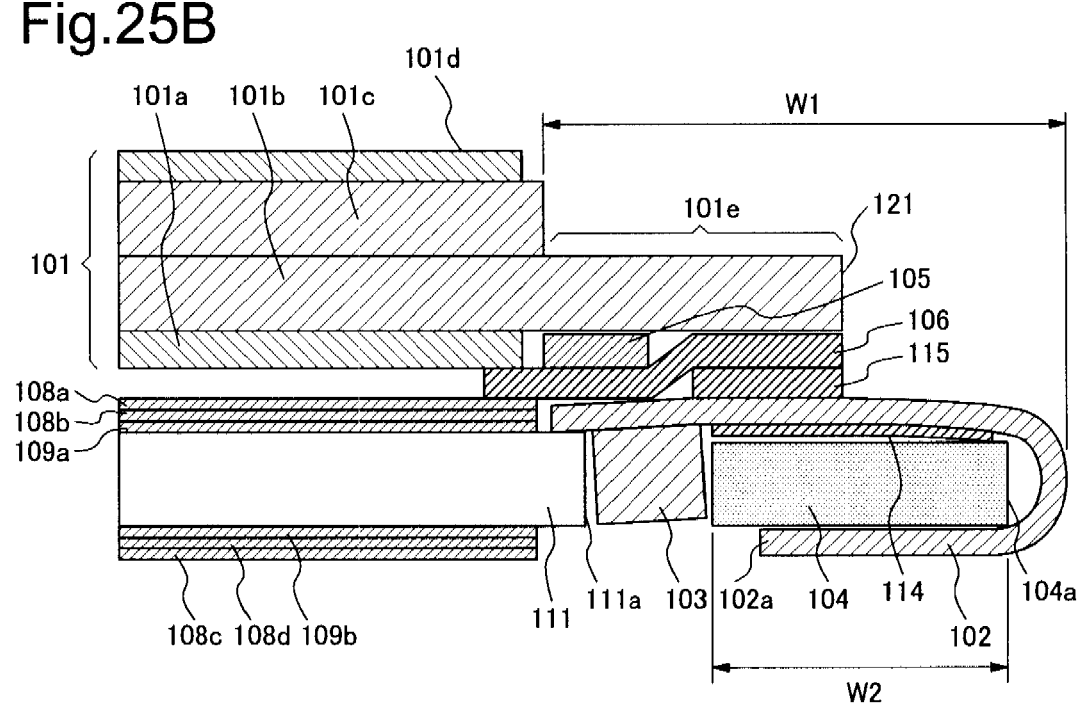
FIG. 25B is a diagram for explaining a problem of the display device in the related art.
Figure 26:
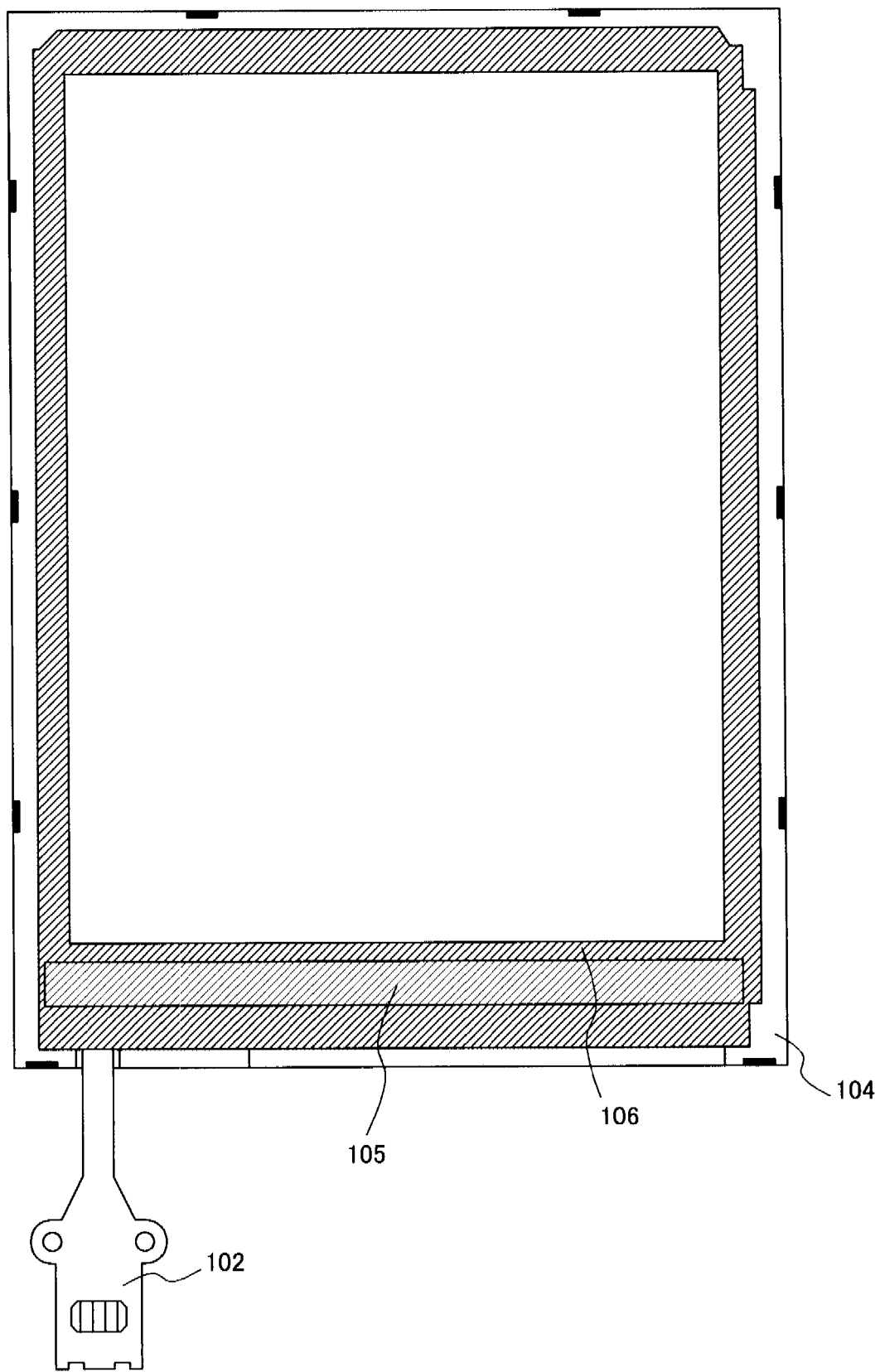
FIG. 26 is a top view of the display device having a spacer arranged in a backlight unit in the related art.

FIG. 25B is a diagram illustrating such disadvantage. As shown in FIG. 25B, when the FPC substrate 102 for the light source is bent so as to cover a side part of the chassis 104 and the side part of the FPC substrate 102 for the light source is fixed to the back face of the display device, a force to restore to the original flat state from the bent state generates in the FPC substrate 102 for the light source. Hereinafter, the force to restore the deformed FPC substrate 102 to the original flat FPC substrate 102 is described as a restoring force.

Since the FPC substrate 102 for the light source is fixed to the chassis 104 with double-stick tape 114, the restoring force operates as a force which peels the FPC substrate 102 for the light source from the chassis 104. As a result, the FPC substrate 102 for the light source is lifted off the chassis 104.

When the FPC substrate 102 for the light source is lifted off the chassis 104, the LED 103 deviates from the optimal position with respect to the end face 111a of the light guide plate 111. Accordingly, the brightness distribution of the incident light in the light guide plate 111 becomes inhomogeneous.

The inhomogeneous brightness distribution deteriorates display quality of the display device.

Fixing force to fix the FPC substrate 102 for the light source to the chassis 104 is adhesive force of the double-stick tape 114. Accordingly, the FPC substrate 102 for the light source is rarely lifted just after bending thereof. Generally, the adhesive force becomes weak gradually due to the restoring force. And after the FPC substrate 102 for the light source is fixed to the chassis 104, the FPC substrate 102 for the light source is lifted off the chassis 104 as time passes. Therefore, aging of display properties is generated due to the restoring force of the FPC substrate 102 for the light source.

A phenomenon in which the FPC substrate 102 for the light source is lifted off the chassis 104 becomes remarkable when a picture frame size W1 of the display device shown in FIG. 25B is decreased. The picture frame size W1 is the width size of a peripheral area including the protruding part 101e in the display panel.

A method for decreasing the picture frame size W1 is to decrease a size W2 of the chassis 104 in the picture frame. A size of the double-stick tape 114 (equivalent to the size W2) become small as the size W2 of a chassis 104 is decreased. That is, an adhesive area becomes small. Thus, the force for fixing the FPC substrate 102 for the light source to the chassis 104 becomes small.

At the same time, because a deformed area of the FPC substrate 102 for the light source approaches the double-stick tape 114, the restoring force of the FPC substrate 102 for the light source is applied to the double-stick tape 114 without dispersing. Therefore, it becomes easy to generate the lift of FPC substrate 102 for the light sources.

In order to make thickness of the display device thin, there is the method of making thickness of chassis 104 thin. In such configuration, since curvature radius of the FPC substrate 102 for the light source becomes small as thickness of the chassis 104 is thinned, large restoring force is generated. Therefore, it becomes easy to generate the lift of FPC substrate 102 for the light sources in the case of this method.

As a result, it is found that a degree of the lift of the FPC substrate for the light source is highly dependent on the position of the spacer fixed on the FPC substrate for the light source based on a consideration on a shape, a size and the like by the inventor of the invention.

Figure 1:
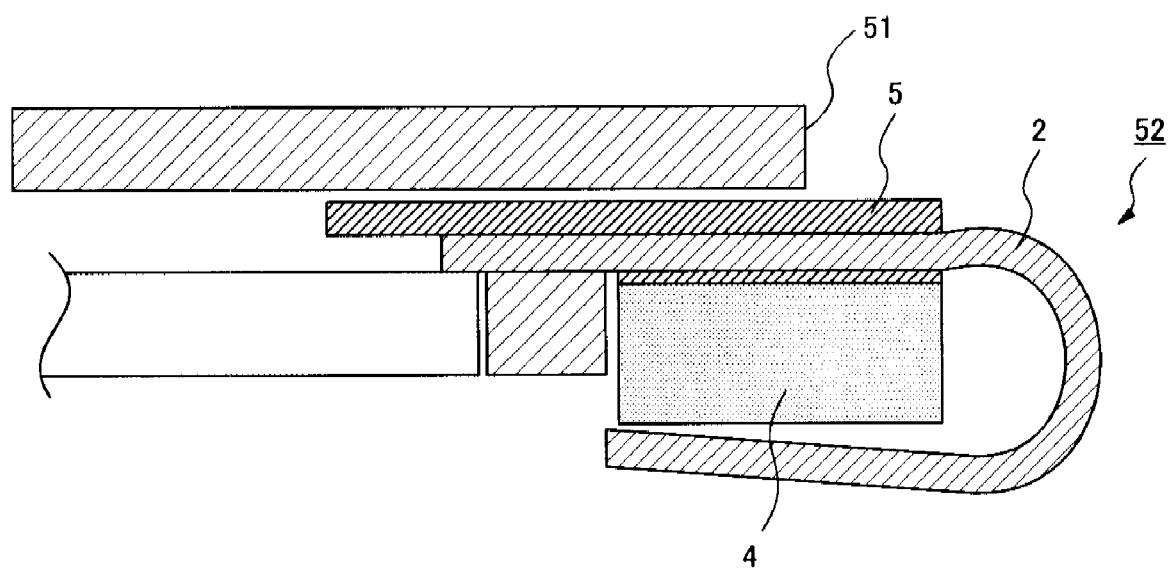
FIG. 1 is a partially sectional view of a display device in a first exemplary embodiment of the present invention.

FIG. 1 is a partially sectional view of a display device according to a first exemplary embodiment accomplished based on the above-mentioned consideration. The display device includes a display panel part 51 which displays the image and a backlight unit 52 which illuminates the display panel part 51.

The backlight unit 52 includes a fixing member 4, an FPC substrate 2 and a spacer 5. The fixing member 4 is being fixed to device casing. The FPC substrate 2 is being fixed to the fixing member 4. The spacer 5 is being fixed to FPC substrate 2.

The FPC substrate 2 in the end part of the display panel part 51 is arranged between the fixing member 4 and the spacer 5. The FPC substrate 2 is arranged between the spacer 5 and the fixing member 4 and is fixed to the fixing member 4 using a double-stick tape or the like.

Peeling of the FPC substrate 2 is suppressed when spacer 5 suppresses FPC substrate 2. A position of the spacer 5 on the FPC substrate 2 preferably includes at least a position in which the FPC substrate 2 peels from the fixing member 4.

Thereby, because the spacer holds down the FPC substrate 2 with a force against the restoring force of the FPC substrate, peeling of the FPC substrate 2 from the fixing member 4 can be prevented.

Next, a second exemplary embodiment is described with reference to FIG. 2 to FIG. 15. In this exemplary embodiment, an LCD device is exemplified as a display device.

Figure 2:
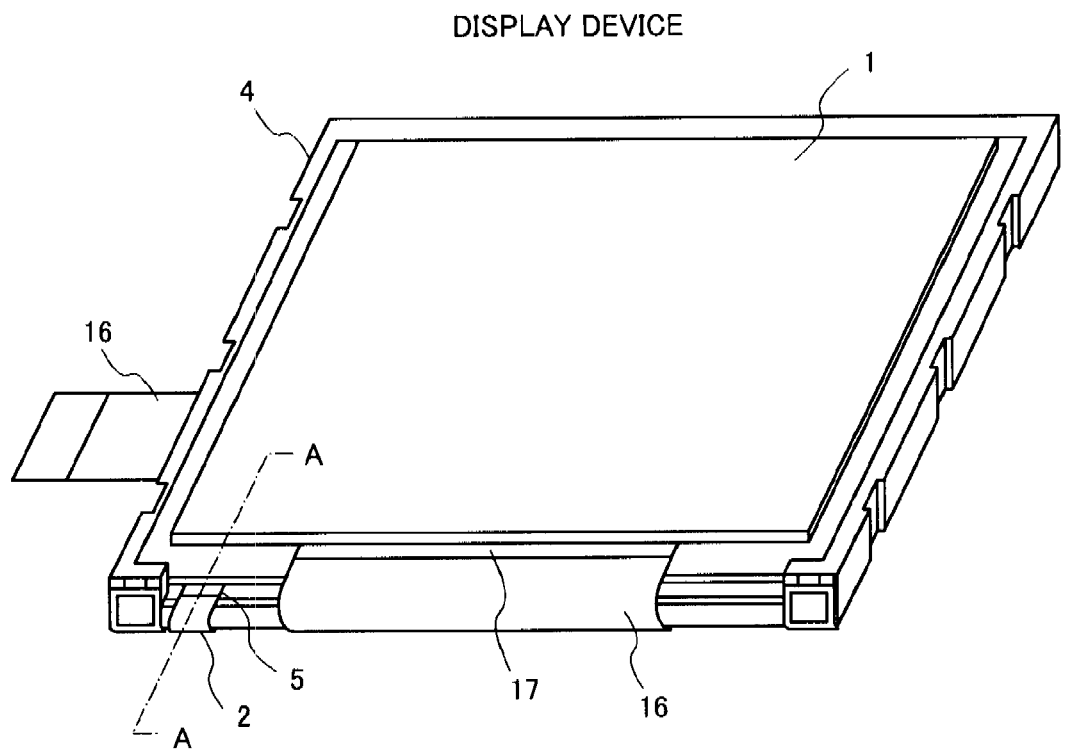
FIG. 2 is a perspective view of a display device on a top side in a second exemplary embodiment of the present invention.
Figure 3:
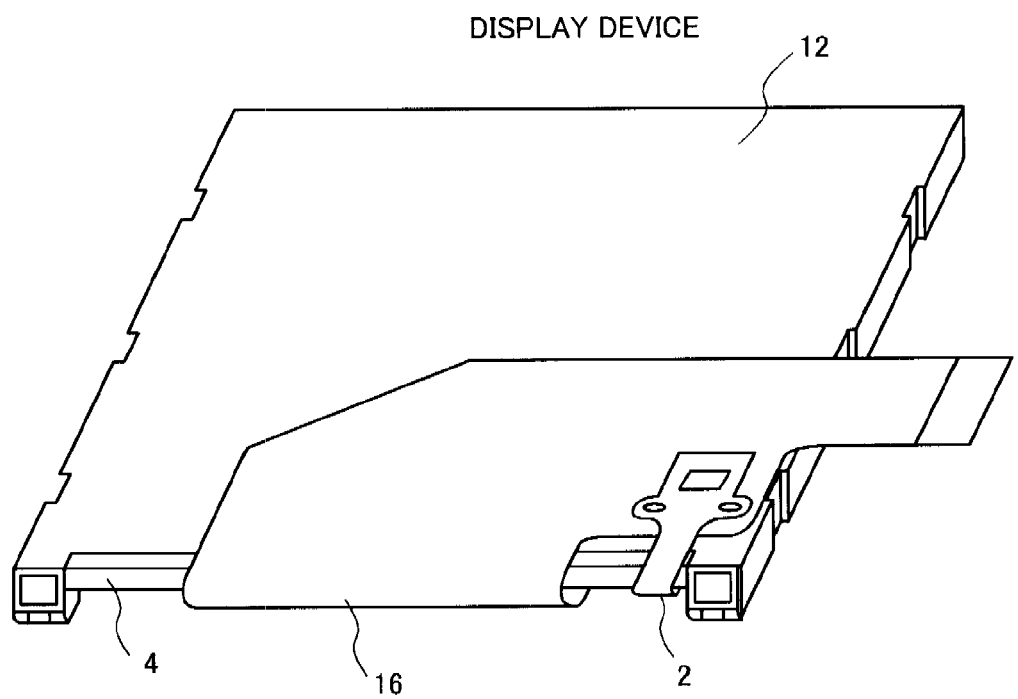
FIG. 3 is a perspective view of the display device on a back side in the second exemplary embodiment of the present invention.
Figure 4:
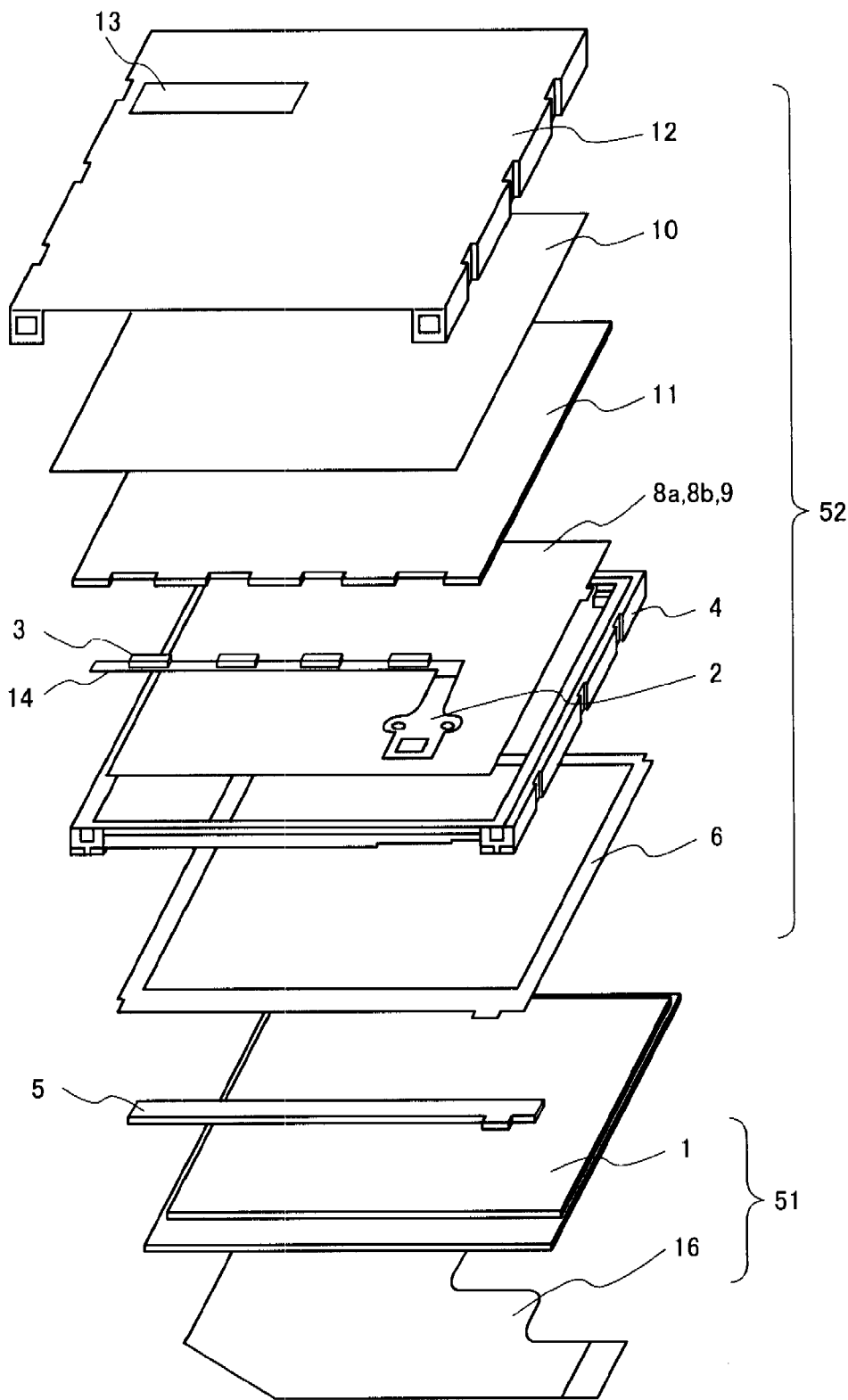
FIG. 4 is an exploded perspective view of the display device in the second exemplary embodiment of the present invention.
Figure 9:
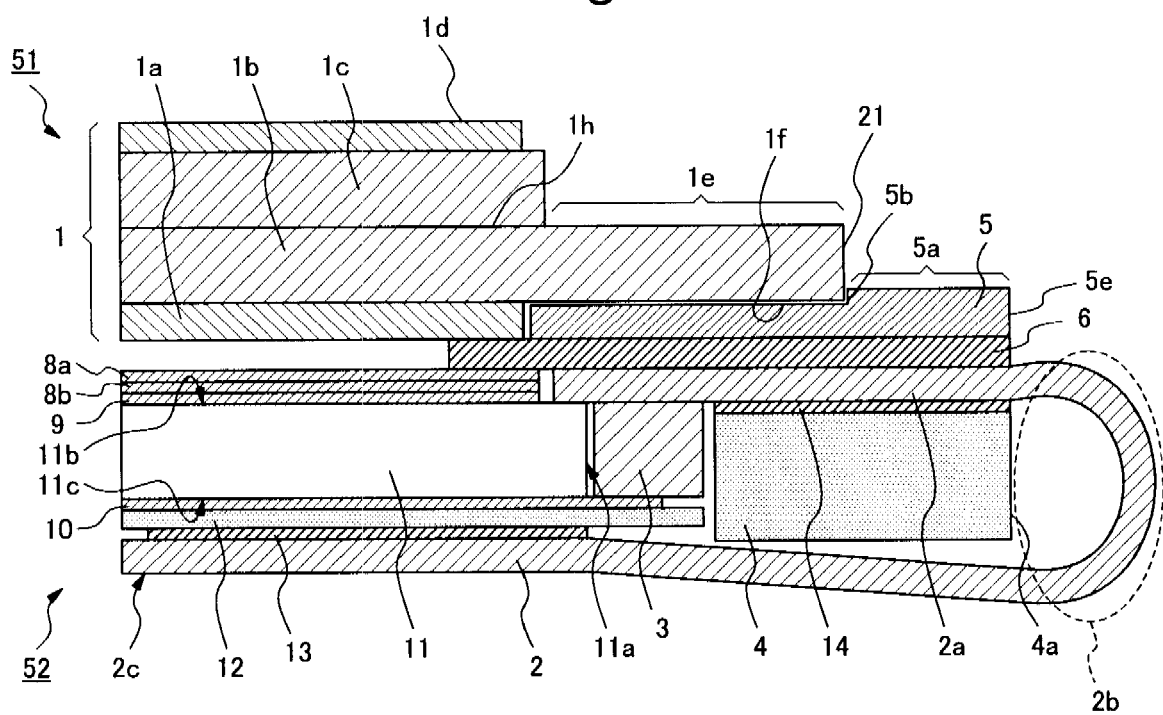
FIG. 9 is a partially sectional view of other display device in the second exemplary embodiment of the present invention.
Figure 10:
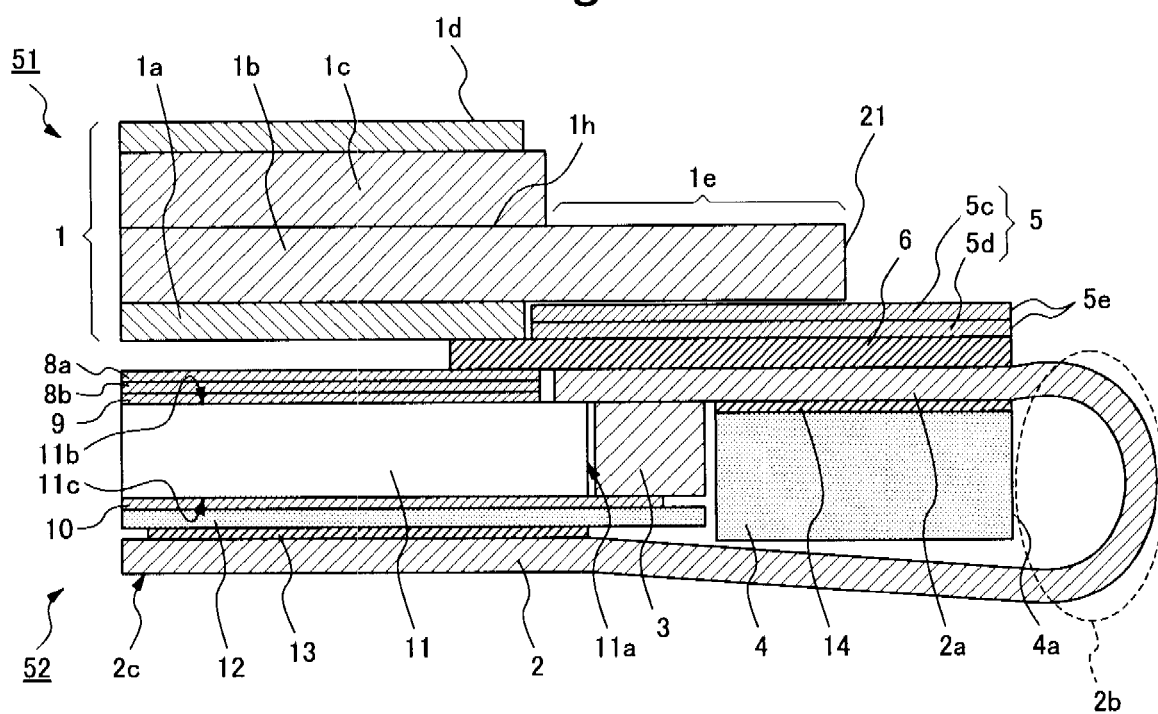
FIG. 10 is a partially sectional view of other display device in the second exemplary embodiment of the present invention.
Figure 11:
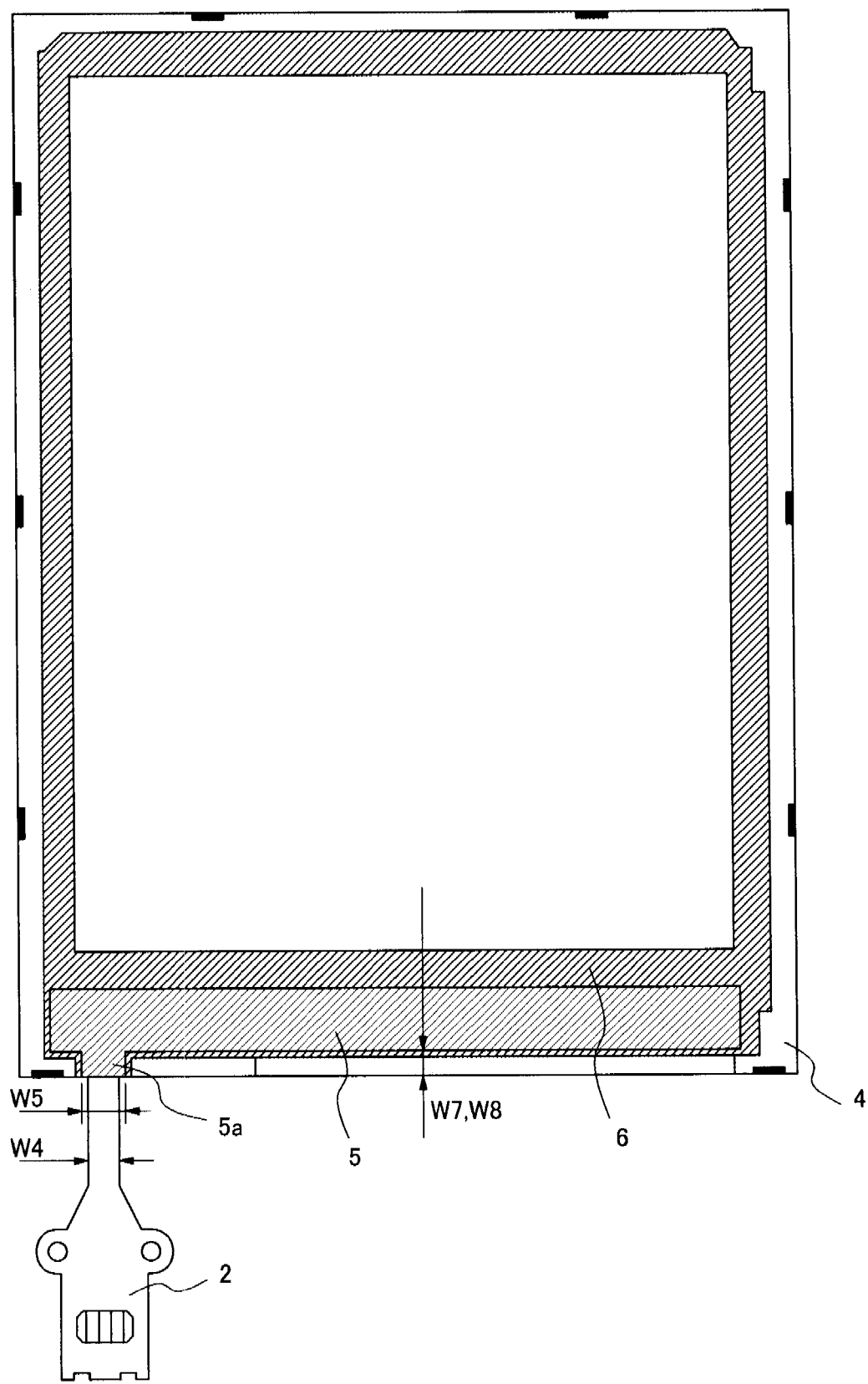
FIG. 11 is a top view of the display device having a spacer arranged in a backlight unit in the second exemplary embodiment of the present invention.
Figure 12:
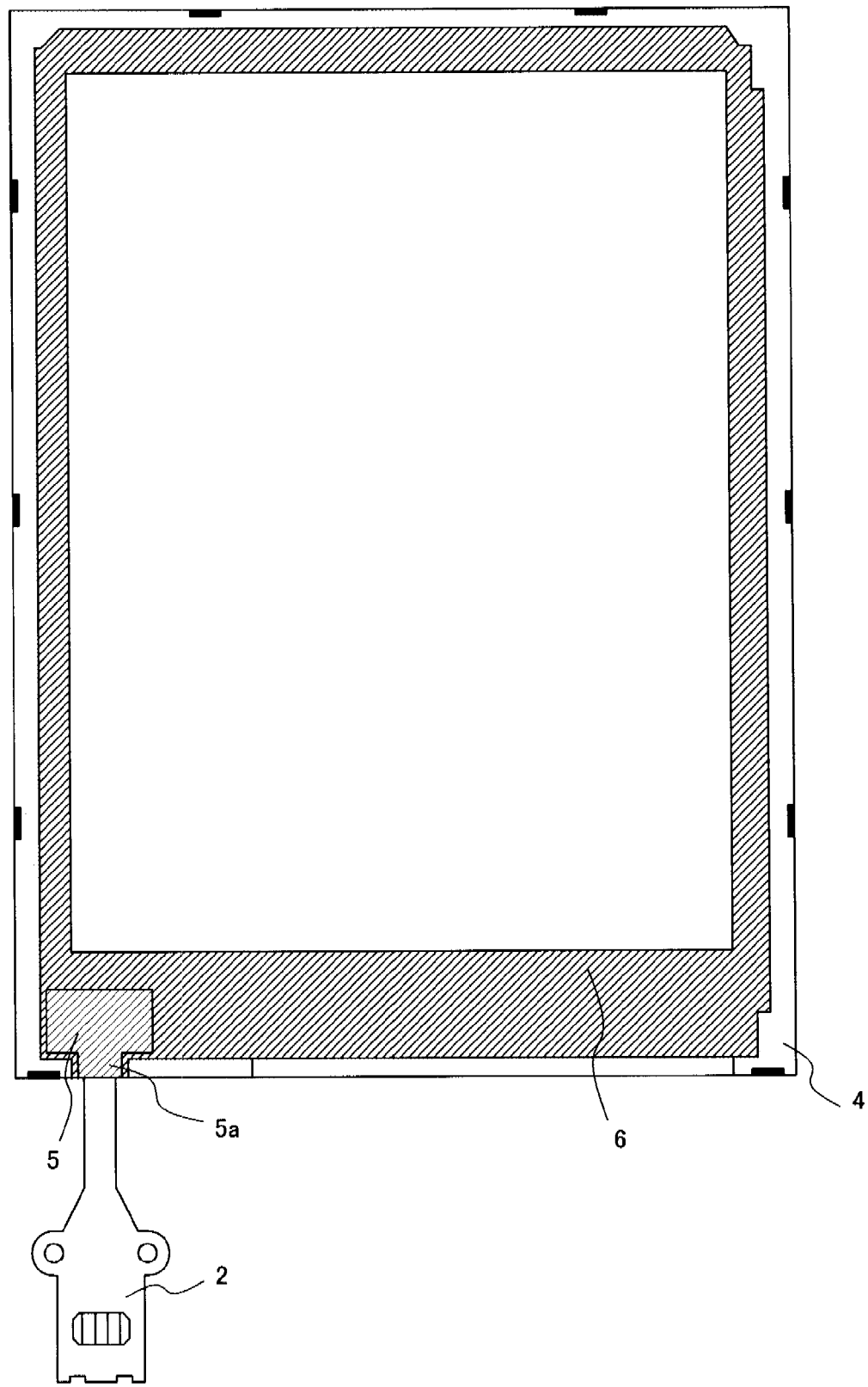
FIG. 12 is a top view of other display device having a spacer arranged in a backlight unit in the second exemplary embodiment of the present invention.

FIG. 2 is a perspective view on a display face side of the display device according to the exemplary embodiment. FIG. 3 is a perspective view on a back face side of the display device. FIG. 4 is an exploded perspective view of the display device. FIGS. 5 to 10 are partially sectional views along an A-A line in FIG. 2. FIG. 11 and FIG. 12 are top views showing the display device having a spacer in a backlight unit.

As shown in FIG. 4, the display device includes a display panel part 51 which performs image display and a backlight unit 52 which illuminates the display panel part 51. As shown in FIG. 2, a display panel 1 is located on a surface side of the display device including the display panel part and the backlight unit. As shown in FIG. 3, a frame 12, such as a sheet metal forming a casing, is located on a back face side of the display device.

Figure 5:
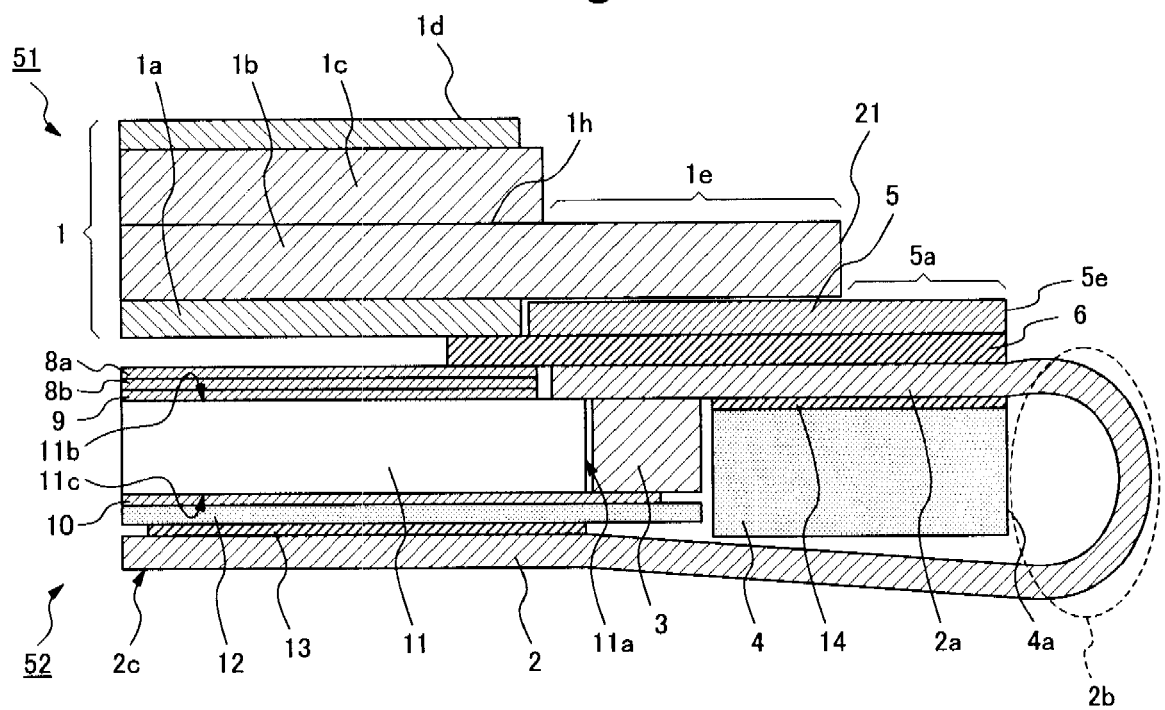
FIG. 5 is a partially sectional view along an A-A line in FIG. 2 of the display device in the second exemplary embodiment of the present invention.

As shown in FIG. 5, the backlight unit 52 includes LED 3, an FPC substrate 2 for the light source, a light guide plate 11, a reflecting sheet 10, an optical sheet, a double-stick tape 6, the frame 12 and a chassis (fixing member) 4.

The LED 3 is a backlight unit source mounted on the FPC substrate 2 for the light source. A light of the LED 3 enters the light guide plate 11 from an end face 11a thereof. The light is emitted from a face 11b of the light guide plate 11 facing the display panel part 51.

The reflecting sheet 10 is arranged on a back face 11c of the light guide plate 11. The reflecting sheet 10 reflects the light which enters from the end face 11a of the light guide plate 11 towards the face 11b facing the display panel part 51.

The optical sheet includes lens sheets 8a and 8b which guides efficiently the light emitted from the light guide plate 11 to the display panel part 51 and includes a diffusion sheet 9 which improves homogeneity of the brightness distribution of the light emitted from the light guide plate 11.

The double-stick tape 6 is an adhesive member to fix a spacer 5 to the FPC substrate 2 for the light source and includes a shielding property. The frame 12 is made of a sheet metal, and is a casing member including members above described, for example, the light guide plate 11 there inside. The chassis 4 is composed of a resin or the like.

As shown in FIG. 4 and FIG. 5, the display panel part 51 includes a display panel 1 and an FPC substrate 16 for driving a display panel. The display panel 1 includes a plurality of pixels arranged in a matrix shape.

A switching element such as a TFT (thin film transistor) is provided for each pixel. The switching elements are controlled by a drive circuit mounted on the FPC substrate 16 for driving a display panel. Thereby, transmissivity of each pixel is controlled.

The display panel 1 includes a pair of glass substrates (optical substrates) 1b and 1c, a polarizer 1d arranged on a surface (an upper face in FIG. 5) of the glass substrate 1c and a polarizer 1a arranged on a back face (a lower face in FIG. 5) of the glass substrate 1b.

The polarizer 1a stuck on glass substrate 1b and the polarizer 1d stuck on glass substrate 1c are formed in the so-called state of cross Nicols.

The switching elements are formed on one of the glass substrates. A color filter and a black matrix are formed on the other of the glass substrates.

A liquid crystal material 1h is filled between the glass substrates 1b and 1c.

As shown in FIG. 5, the glass substrate 1b includes a protruding part 1e on which a driver IC 17 (refer to FIG. 2) is mounted. The protruding part 1e is arranged on a side (in FIG. 5, on the right side in the page) from which the FPC substrate 2 for the light source is extracted.

As shown in FIG. 5, a drawer part 2a of the FPC substrate 2 for the light source is fixed to the chassis 4 using a double-stick tape 14, and is bent so as to cover an end part 4a of the chassis 4. The bent area is described as a flection part 2b. An end part 2c of the FPC substrate 2 for the light source is fixed to the frame 12 of the back side of the backlight unit 52 using a double-stick tape 13.

An end part of the polarizer 1a in the display panel 1 is fixed to the FPC substrate 2 for the light source using the double-stick tape 6. The FPC substrate 2 for the light source is fixed to the chassis 4 using the double-stick tape 14.

Figure 16:
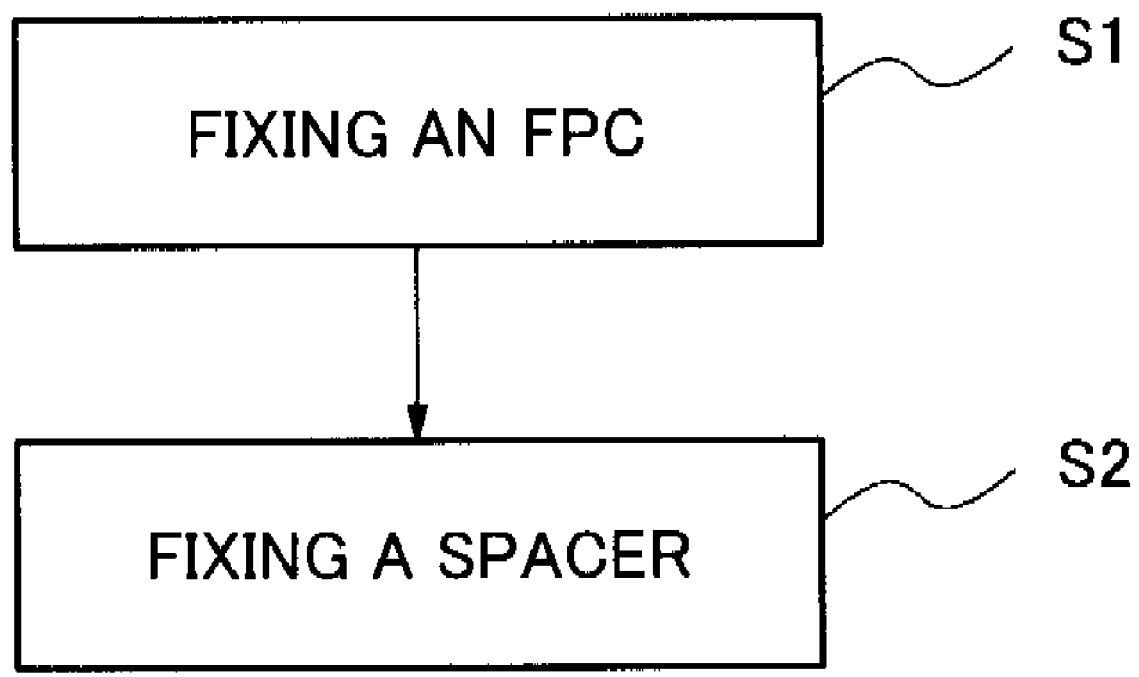
FIG. 16 is a flow chart showing manufacturing procedures of the display device in second exemplary embodiment of the present invention.

Basic manufacturing steps for production of an LCD device with such a configuration are shown in FIG. 16. First, the FPC substrate 2 for the light source is fixed to the chassis 4 using the double-stick tape 14 (Step S1). Next, the spacer 5 is fixed to the FPC substrate 2 for the light source using the double-stick tape 6 (Step S2).

When the spacer 5 is fixed to the FPC substrate 2 for the light source, the spacer 5 is fixed at least to a position corresponding to the drawer part 2a in which the FPC substrate 2 for the light source peel from the chassis 4. The double-stick tape 6 includes at least light shielding property.

In such an LCD device, the LEDs 3 mounted on the FPC substrate 2 for the light source are turned on or turned off according to a level of a signal supplied from an outside apparatus. A light from the LED 3 enters an end face 11a of the light guide plate 11. The light is emitted toward the display panel 1 from a face 11b of the light guide plate 11 facing the display panel 1.

An external signal from the FPC substrate 16 for driving a display panel (refer to FIG. 2 and FIG. 3) fixed to the protruding part 1e of the glass substrate 1b is inputted to a driver IC 17 (refer to FIG. 2). The driver IC 17 drives the switching elements based on the external signal.

An electric field applied to the liquid crystal material changes according to an ON state and an OFF state of the switching element. An orientation of liquid crystal molecule changes according to the electric field. Only light with a component of a polarization direction of the polarizer 1a among lights from the LEDs 3 passes the polarizer 1a.

When the light which passes the polarizer 1a passes the liquid crystal material, the light is polarized according to the orientation of the liquid crystal material.

The light polarized by the liquid crystal material enters a polarizer 1d. Only light with a component of a polarization direction of the polarizer 1d passes the polarizer 1d. Thereby, it becomes possible to display an image in the display panel 1.

In order to fill a gap between the protruding part 1e of the glass substrate 1b and the double-stick tape 6, as shown in FIG. 25A, in Japanese Patent Application Laid-Open No. 2007-148048, the spacer 105 is arranged to the area of the protruding part 101e opposing the LED 103.

On the other hand, the spacer 5 according to this exemplary embodiment is lengthened toward an outer side (in FIG. 5, toward the right side in the page) from an end part 21 of the protruding part 1e in the display panel 1. The spacer 5 at least is fixed to an area in which the FPC substrate 2 for the light source is likely to be unsticking from the chassis 4. The area is the drawer part 2a in which the FPC substrate 2 for the light source is fixed with the double-stick tape 14.

The spacer 5 suppresses a force which acts to unstick the FPC substrate 2 for the light source from the chassis 4. As shown in FIG. 3, the FPC substrate 2 for the light source is fixed to the FPC substrate 16 for driving a display panel with soldering or the like. The FPC substrate 16 for driving a display panel is bent toward a back face of the display device, and the end area thereof is fixed to the frame 12 using a double-stick tape.

At this time, the FPC substrate 2 for the light source is fixed to the frame 12 using the double-stick tape 13 in the state where it is bent like FPC substrate 16 for driving a display panel at a back face of the display device, as shown in FIG. 5.

Accordingly, the restoring force which restores the FPC substrate 2 for the light source to an original flat state is generated in the flection part 2b of the FPC substrate 2 for the light source. The restoring force acts as a force which unsticks the FPC substrate 2 for the light source from the chassis 4.

Then, as mentioned above, in this exemplary embodiment, the spacer 5 is arranged not only on a lower part of the protruding part as in the related art, but also at least in an area in which the FPC substrate 2 for the light source is likely to unstick from the chassis 4.

It is preferable that the spacer 5 is made of a material which generates resistance to bending larger than the restoring force of the FPC substrate 2 for the light source. As a material of spacer 5, the plastic materials, such as PET (polyethylene terephthalate), and the metallic substance the metallic substance with elasticity can be exemplified.

It is preferable that a thickness of the spacer 5 is substantially equal to a thickness of the polarizer 1a. If manufacturing tolerance of the spacer 5 is taken into consideration, it is preferable that the spacer 5 is thinner than the polarizer 1a by manufacturing tolerance thereof. The spacer 5 may be made of a transparent material and may be made of a light shielding material.

If the spacer 5 is made of the light shielding material, the spacer 5 blocks stray lights including a light which passes through the double-stick tape 6 and a reflected light from other materials. Accordingly, the stray light does not enter a display area of the display panel 1.

In the above-mentioned description, the end part 5e of the extension part 5a in the spacer 5 is located substantially at the same position as that of the end part 4a of the chassis 4. The spacer 5 is disposed in the position that straddles the end part of the protruding part 1e at least.

Figure 6:
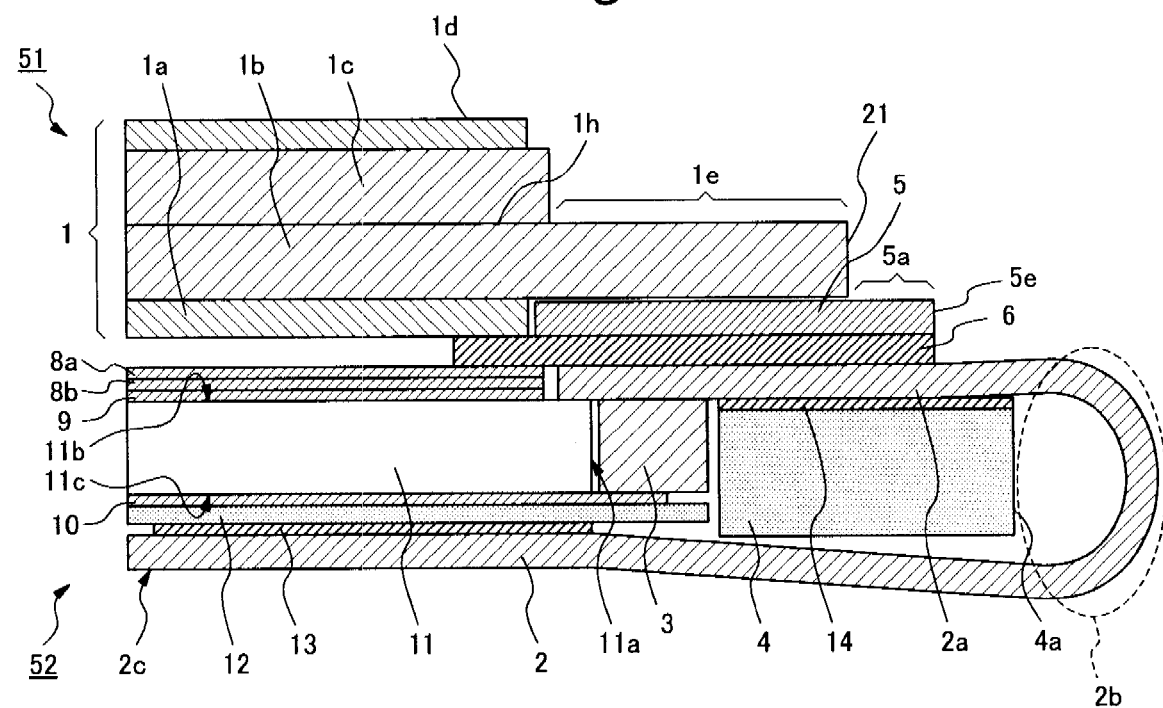
FIG. 6 is a partially sectional view of other display device in the second exemplary embodiment of the present invention.
Figure 7:
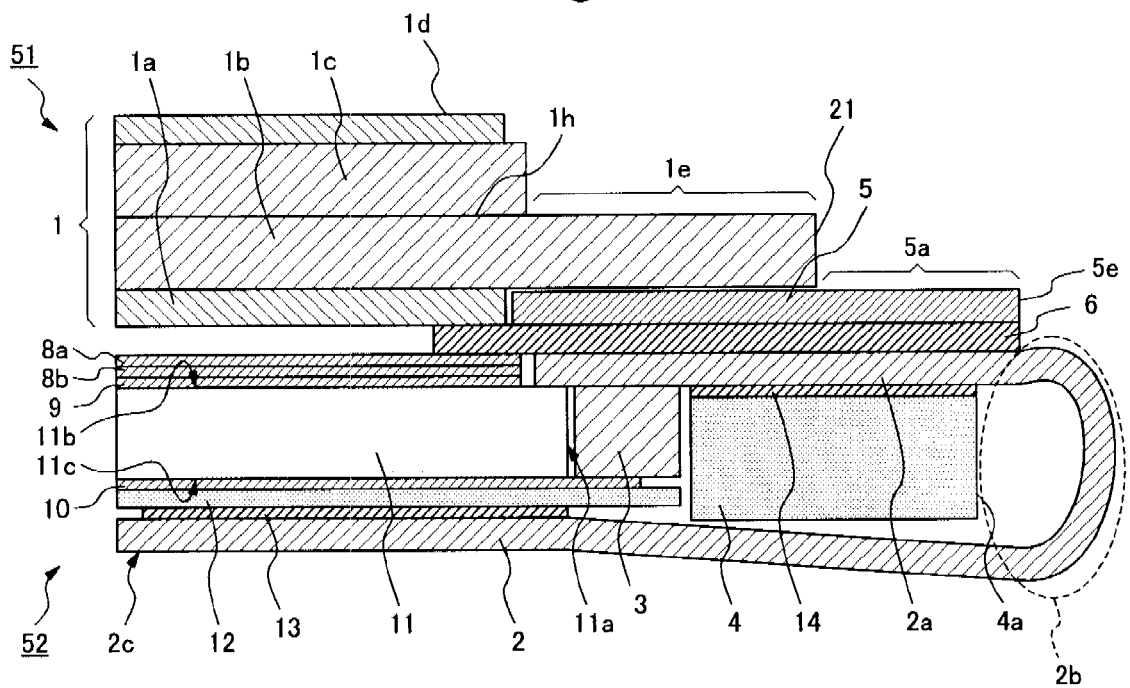
FIG. 7 is a partially sectional view of other display device in the second exemplary embodiment of the present invention.

Accordingly, in this exemplary embodiment, the position of the end part 5e of the spacer 5 does not need to be equal to the position of the end part 4a of the chassis 4. FIG. 6 and FIG. 7 exemplify configurations in which a position of the end part 5e of the spacer 5 does not accord with a position of the end part 4a of the chassis 4. FIG. 6 shows a configuration in which the end part 5e of the spacer 5 is located between the end part 21 of the protruding part 1e and the end part 4a of the chassis 4.

FIG. 7 shows a configuration in which the end part 5e of the spacer 5 is located at the outside (on the right side of the page in FIG. 7) of the end part 4a of the chassis. The configuration shown in FIG. 7 is preferably formed when it is possible to make a large picture frame size.

Figure 8:
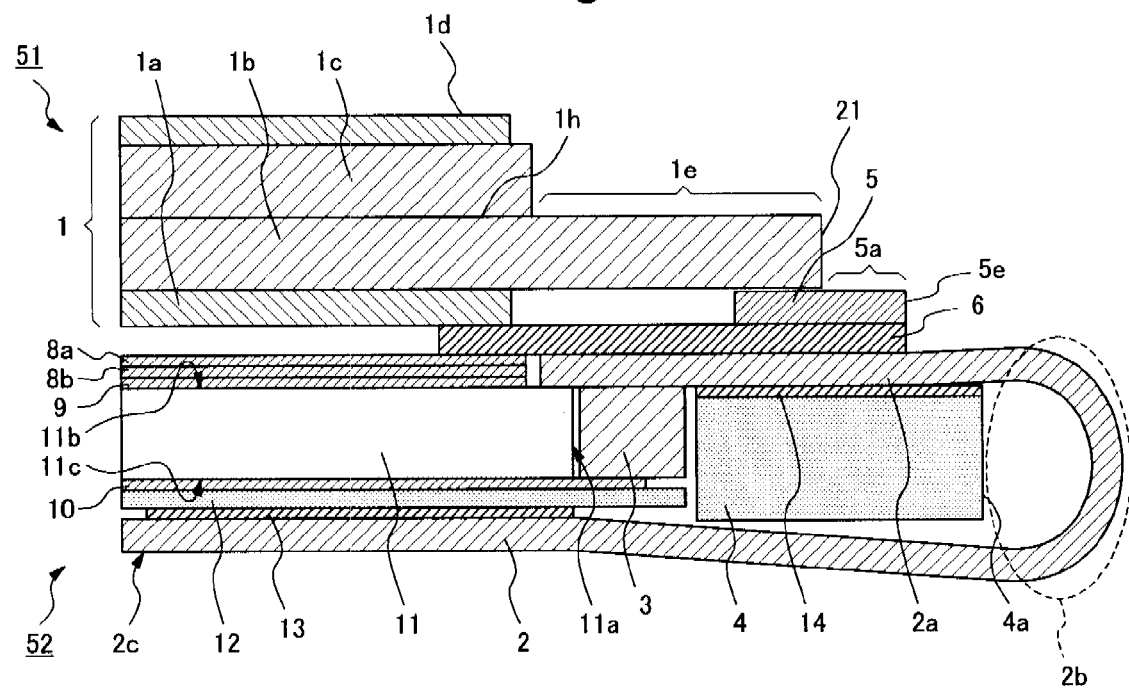
FIG. 8 is a partially sectional view of other display device in the second exemplary embodiment of the present invention.

As shown in FIG. 8, the spacer 5 may be arranged only in the neighborhood of the end part 21 of the protruding part 1e. It is preferable to arrange the spacer 5 in an area which spreads on both of near side and far side of the end part of the protruding part 1e at least. It is preferable that the spacer 5 is provided at least in a position in which the FPC substrate 2 for the light source unsticks from the chassis 4.

The cross section shape of the above-mentioned spacer 5 has constant thickness. However, in this exemplary embodiment, the spacer 5 may not be constant thickness. For example, FIG. 9 shows a stepped part 5b provided in the spacer 5.

The stepped part 5b touches a corner part of the end part 21 of the protruding part 1e. In such a configuration, even if the extension part 5a of the spacer 5 is pushed toward the glass substrate 1b by the restoring force of the FPC substrate 2 for the light source, forces of two types suppress the restoring force. The force of the one type is the force in which spacer 5 suppress FPC substrate 2 for the light sources.

The force of the one type is mainly made up of elastic force of the spacer 5 and the force which restricts slipping between the spacer 5 and the FPC substrate 2 for the light sources by the adhesive power of double-stick tape 6.

The force of the other type is the force generated when stepped part 5b touches both a back face 1f and the end part 21 of the protruding part 1e, when spacer 5 is pushed up by the restoring force of FPC substrate 2 for the light sources.

Because the forces of the two types above-described act on the spacer 5 as a resistance to bending against the restoring force, the lift of the FPC substrate 2 for the light source is suppressed effectively.

Because the force of the two types acts on the spacer 5 as a resistance to bending against the restoring force, the lift of the FPC substrate 2 for the light source is suppressed effectively.

In the description mentioned above, the spacer 5 is made up of the one member. However, the spacer 5 may be made up of two or more members. FIG. 10 is exemplifying the spacer 5 laminating the thin plat members 5c and 5d.

A PET (polyethylene terephthalate) can be exemplified as such an example of the thin plate member. Further, the spacer 5 can be formed by fixing plural thin PET plates using a double-stick tape. When the spacer 5 is formed by plural thin plates, it is not necessary that each plate is made of the same material.

Specifically, for example, it is preferable that a thermal expansion coefficient of the plate 5c near the glass substrate 1b is larger than that of the plate 5d near the light guide plate 11. Thermal stress to bend the FPC substrate 2 for the light source toward the glass substrate 1b is generated in the plates 5c and 5d due to heat generation in the LED 3 and a driver IC 17.

However, if the coefficient of thermal expansion of the plate 5c is larger than that of the plate 5d, a difference of expanding quantity caused by a difference in the thermal expansion coefficient acts as a resistance to bending against the restoring force. Accordingly, the lift of the FPC substrate 2 for the light source is suppressed effectively.

If the spacer 5 is located on the drawer part 2a of the FPC substrate 2 for the light source, the shape of the spacer 5 is not limited to flat in the exemplary embodiment. For example, as shown in FIG. 11, the spacer 5 can be arranged on the whole area of one side of a display panel from which the FPC substrate 2 for the light source is drawn.

As shown in FIG. 12, the spacer 5 can be also arranged on a partial area of one side of the display panel from which the FPC substrate 2 for the light source is drawn. In FIG. 11 and FIG. 12, the extension part 5a of the spacer 5 is arranged only in an area covering the FPC substrate 2 for the light source.

If the extension part 5a of the spacer 5 is arranged at least in an area covering the FPC substrate 2 for the light source, the lift of the FPC substrate 2 for the light source is suppressed as an advantage of such configuration.

Accordingly, as far as the extension part 5a of the spacer 5 covers the FPC substrate 2 for the light source, the extension part 5a may be arranged so as to spread to other areas.

In the backlight unit 52, for example, the FPC substrate 2 for the light source is 2.5 mm in width (for example, W4 shown in FIG. 11), and the chassis 4 is 1.4 mm in side part length (for example, W7 shown in FIG. 11).

In such a configuration, the extension part 5a of the spacer 5 is 3.0 mm in width (for example, W5 shown in FIG. 11) and is 1.4 mm in length (for example, W8 shown in FIG. 11).

The width of the extension part 5a is set to the 3.0 mm in order that the FPC substrate 2 for the light source covers with the spacer 5 completely, even if the deviation of the sticking-on position occurs when the spacer 5 is stuck on FPC2 for the light source.

The length of the extension part 5a is set to the 1.4 mm in order to deposit the extension part 5a inside the appearance of the display device, and in order to make the adhesion area of each double-stick tapes 6 and 14 the maximum.

Further, when a tape having a strong adhesiveness such as adhesive force 19.61 N/20 mm is used as the double-stick tape 14 or the like, the lift of the FPC substrate 2 for the light source can be suppressed effectively.

Next, it is described below that the spacer 5 in the exemplary embodiment suppresses the lift of the FPC substrate 2 for the light source and aging of display properties.

First, the example about a suppression effect for the lift of the FPC substrate 2 for the light source generated by the spacer 5 is described. The suppression effect was tested by the measurement of a force required to the predetermined amount bending FPC substrate 2 for the light source and the spacer 5.

The FPC substrate 2 for the light source for the test included an electric conductor, a base film and a cover film. The base film was composed of a polyimide film about 25 µm thick. The cover film was composed of a polyimide film about 12.5 µm thick. The electric conductor was composed of a copper foil about 35 µm thick.

Two or more electric conductors were arranged in parallel in the drawer part 2a of the FPC substrate 2 for the light source, and a line width of each electric conductor was about 0.5 mm. Each of the electric conductors was sandwiched between the base film and the cover film, and was stuck thereto.

The spacer 5 was a sheet member formed by sticking together PET films of about 0.188 mm and about 0.100 mm thick using a double-stick tape of about 0.03-mm in thickness. Then, thickness of the spacer 5 was about 0.318 mm.

Figure 13:
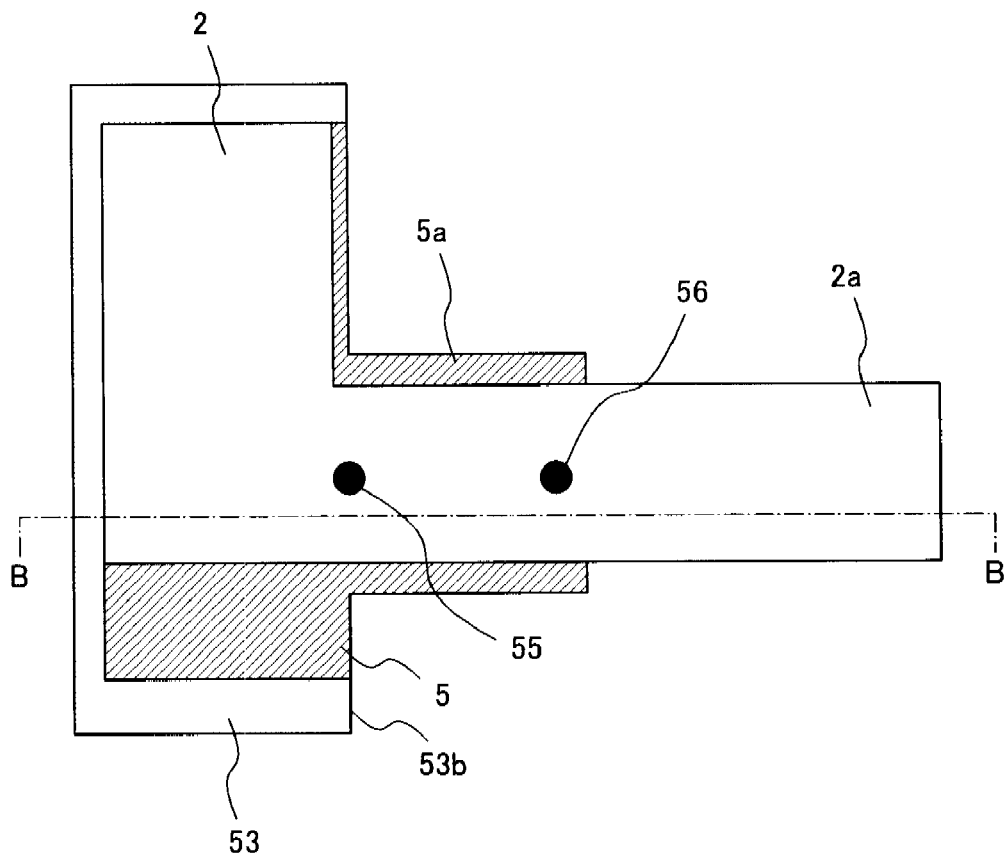
FIG. 13 is a top view of equipment for measuring a resistance force for bending of an FPC substrate for the light source and a spacer in the second exemplary embodiment of the present invention.
Figure 14:
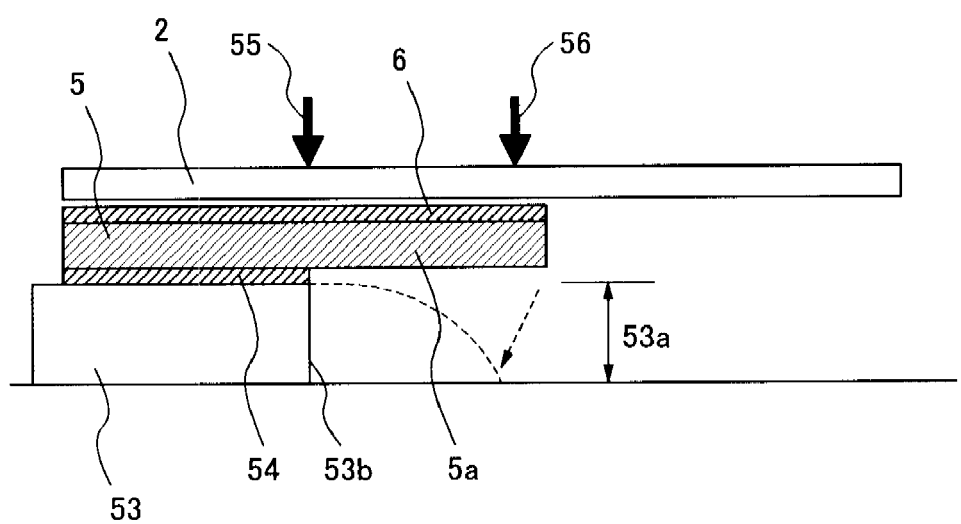
FIG. 14 is a cross sectional view along a B-B line in FIG. 13 in the second exemplary embodiment of the present invention.

FIG. 13 and FIG. 14 are schematic diagrams of a measurement apparatus for measuring the resistance to bend the FPC substrate 2 for the light source and the spacer 5. FIG. 13 shows a top view of the apparatus, and FIG. 14 shows a cross sectional view along a B-B line in FIG. 13.

As shown in FIG. 13 and FIG. 14, the FPC substrate 2 for the light source and the spacer 5 as a test sample were fixed on a support table 53 using a double-stick tape 54. There, the test sample was set up so that an end part thereof was located outside an end part 53b of a support table 53 (on the right side of the page in FIG. 14).

The end part of the test sample corresponded to the drawer part 2a of the FPC substrate 2 for the light source and the extension part 5a of the spacer 5. And a supporting point 55 corresponding to the end part 53b of the support table 53 was pressed down so that the sample may not move.

In such a state, a test load was applied to the power point 56 corresponding to the position of the end part 5e of the extension part 5a. The test load was applied in the direction perpendicular to the face of the test sample. The test sample was bent with the test load.

Then, a force required to bend the test sample by an amount corresponding to a thickness 53a of the support table 53 was measured. The test result is shown in Table 1. In Table 1, a bending dimension corresponds to the thickness 53a of the support table 53.

Accordingly, the bending dimension of 0.3 mm shows the thickness 53a of the support table 53 of 0.3 mm. The bending dimension of 0.6 mm shows the thickness 53a of the support table 53 of 0.6 mm.

Table 1 show that the test sample including the spacer 5 and the FPC substrate 2 for the light source requires quite a large force compared with a force required to bend the test sample including only the FPC substrate 2 for the light source, despite the bending dimension.

That is, if spacer 5 is formed, the force of always suppressing the restoring force of FPC substrate 2 for the light sources can make it act on the drawer part 2a of the FPC substrate 2 for the light source. The force to suppress the drawer part 2a of the FPC substrate 2 for the light source is large enough compared with a force to lift the FPC substrate 2 for the light source.

Accordingly, such spacer can effectively suppress the lift of the FPC substrate 2 for the light source.

TABLE 1

| | Bending Dimension | |
| --- | --- | --- |
| | 0.3 mm | 0.6 mm |
| Bending force (Spacer + FPC for light sources) | 2.08 N | 5.46 N |
| Bending force (only FPC for light sources) | 0.40 N | 0.72 N |

Next, a suppression effect for aging of display properties generated by the spacer 5 in the example is described. An accelerated test in which the test sample was put in a temperature-controlled bath of 80° C. for 500 hours was performed.

The display properties (brightness distribution) of the display device before and after the accelerated test were visually checked. As the test samples, five display devices having a configuration shown in FIG. 5 and five display devices having a configuration of the related art shown in FIG. 25A were employed.

Figure 15:
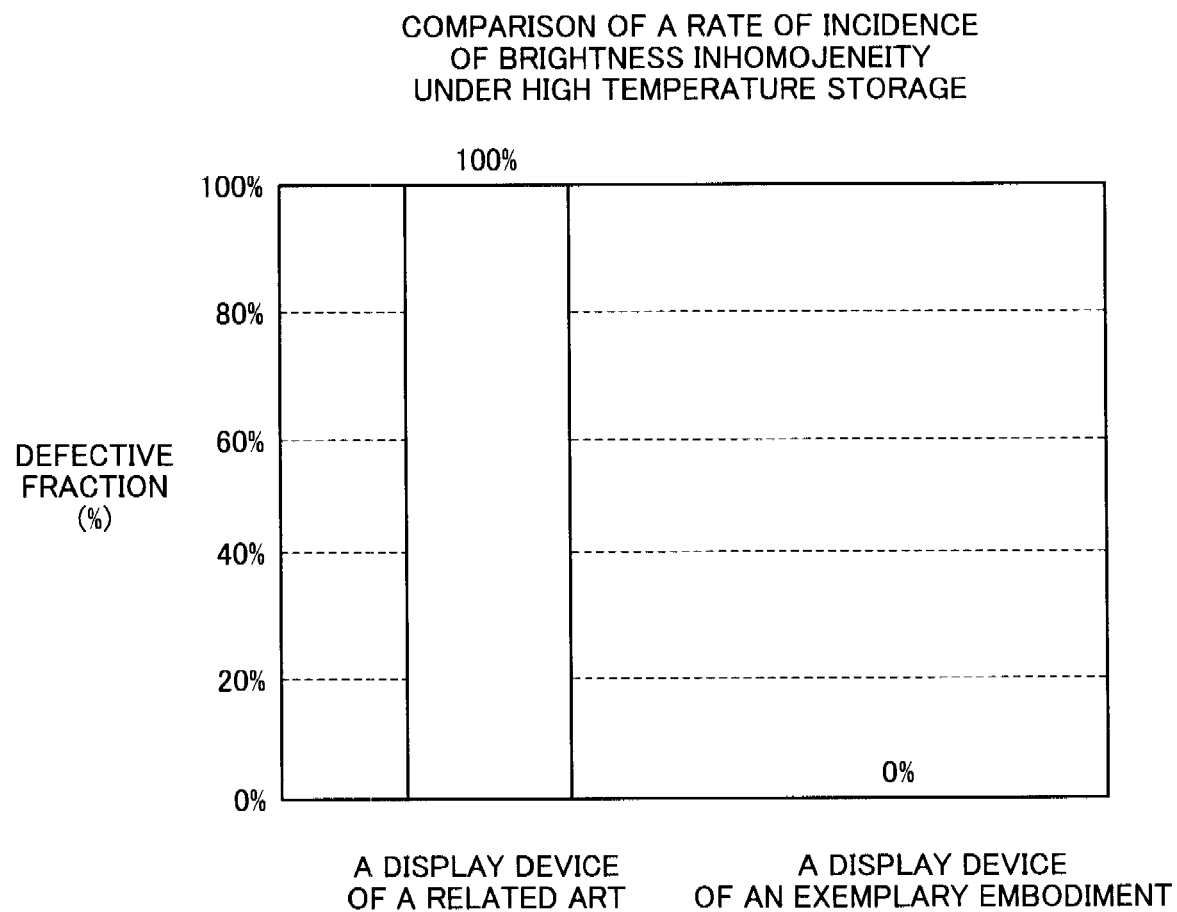
FIG. 15 is a diagram showing a rate of incidence of brightness inhomogeneous part in the display device which is stored under high temperature of an example in second exemplary embodiment of the present invention.

FIG. 15 illustrates the result of the accelerated test. In the display device of the related art using the spacer shown in FIG. 25A, the heterogeneity of the brightness distribution became large and the defective fraction was 100%.

On the other hand, all the display devices according to the exemplary embodiment were not defective after the accelerated test.

Accordingly, it is proved that the spacer 5 can suppress degradation of the display properties by time aging.

The spacer is arranged in the end part of the polarizer in the backlight unit of the display panel and in an area spreading on both near side and far side of the end part in the protruding part of the glass substrate.

The thickness of the spacer is substantially equal to the thickness of the polarizer. Thereby, since the spacer can suppress the lift of the FPC substrate for the light source, positional displacement of the LED can be prevented.

Accordingly, the brightness distribution of an incident light in a display panel becomes homogeneous, and homogeneous display panel can be maintained for a long time. Therefore, image display quality of the display device improves, and aging of the display device is suppressed.

The spacer is preferably arranged at least in a position on the fixing member which the FPC substrate unsticks from. In such a configuration, a large installation area of the spacer is possible compared with a configuration in which spacer lies in an area spreading on both the near side and the far side of the end part in the protruding part.

Since the spacer suppresses the lift of the FPC substrate, an area of the double-stick tape for fixing the FPC substrate for the light source to the chassis can be reduced. Accordingly, the display device can be downsized by reducing the picture frame size without worsening the aging of the display device and degrading the display quality thereof.

When the spacer is formed by a plurality of plates and one plate near the FPC substrate for the light source has the thermal expansion coefficient smaller than the other plates, even if the heat generates from the LED or the like, the lift of the spacer can be suppressed efficiently.

Accordingly, a range of driving conditions of the LED (power consumption of the LED and the like) can be widened.

Next, a display device according to a third exemplary embodiment of the present invention will be described with reference to FIGS. 17 to 19.

Figure 17:
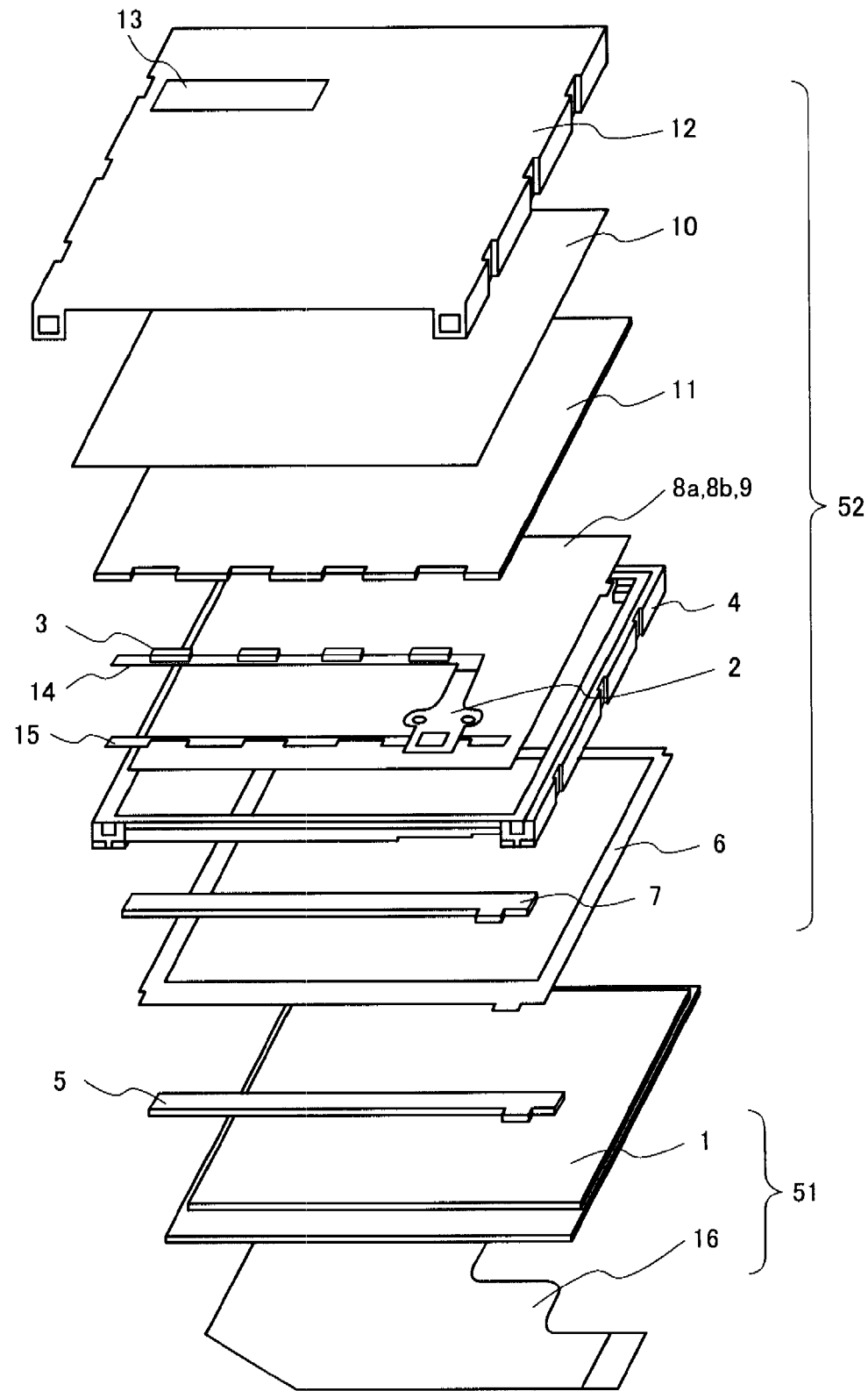
FIG. 17 is an exploded perspective view of a display device in a third exemplary embodiment of the present invention.
Figure 18:
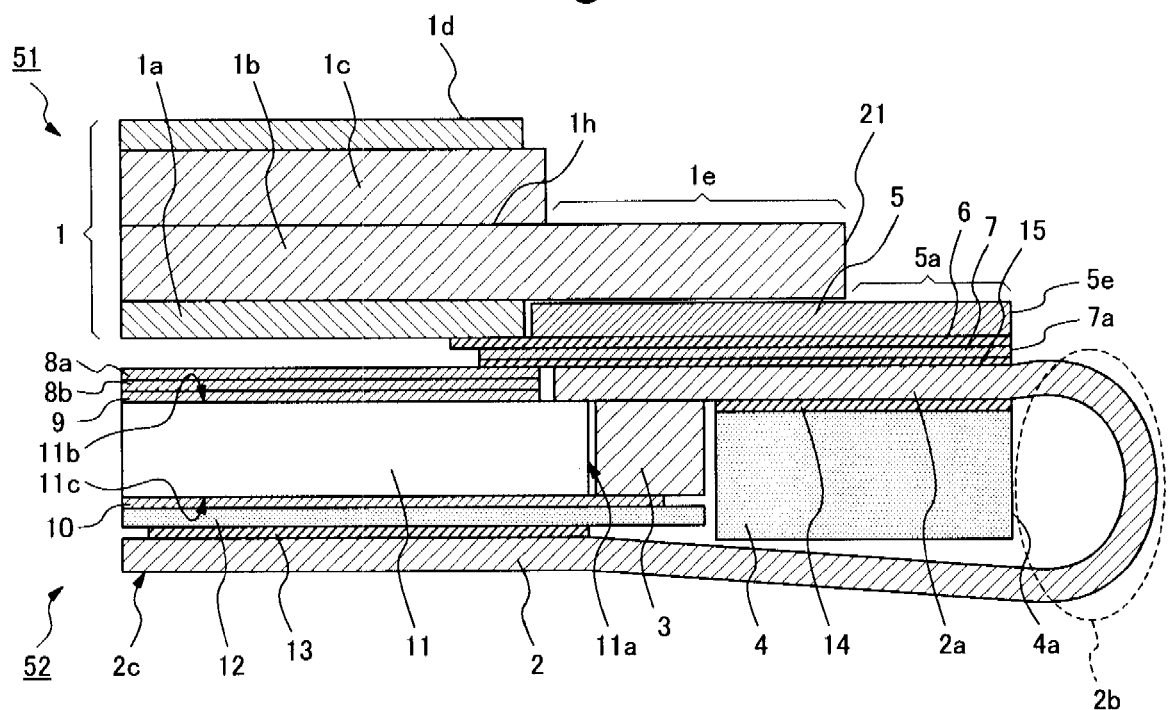
FIG. 18 is a partially sectional view of the display device in the third exemplary embodiment of the present invention.
Figure 19:
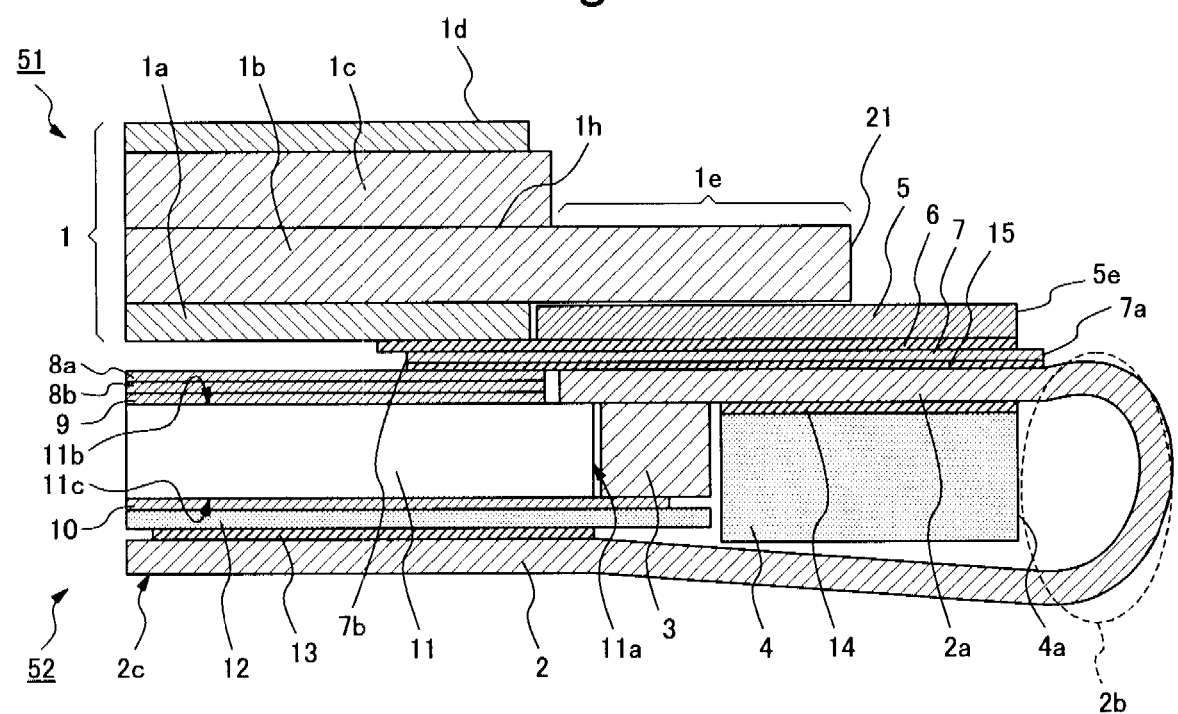
FIG. 19 is a partially sectional view of other display device in the third exemplary embodiment.

FIG. 17 is an exploded perspective view of a display device according to the exemplary embodiment, and FIG. 18 and FIG. 19 are partially sectional views showing a structure of the display device in the same position as an A-A line in FIG. 2.

In the above description, as shown in FIG. 5, only double-stick tape 6 is arranged between the spacer 5 and the FPC substrate 2 for the light source.

However, since a thickness of a ready-made double-stick tape is specified, it may be difficult to obtain the double-stick tape having a desired thickness. In such a case, the gap between the display panel part 51 and the backlight unit 52 cannot be filled with only the double-stick tape 6.

When the restoring force of the FPC substrate 2 for the light source is large, it may be difficult to prevent the lift of the FFC substrate 2 for the light source only with the spacer 5 mentioned above.

Accordingly, in the exemplary embodiment, as shown in FIG. 17 and FIG. 18, a spacer 7 is arranged between the FPC substrate 2 for the light source and the double-stick tape 6. The spacer 7 is fixed to the spacer 5 by the double-stick tape 6 and fixed to the FPC substrate 2 for the light source by a double-stick tape 15.

In such a configuration, the gap between the display panel part 51 and the backlight units 52 which cannot be filled only with the double-stick tape 6 can be filled with the spacer 7 and the double-stick tape 6.

An elastic force of the spacer 7 acts as a resistance to bending against the restoring force of the FPC substrate 2 for the light source. Accordingly, the lift of the FPC substrate 2 for the light source is suppressed.

It is preferable that such spacer 7 is made of a material which generates the resistance to bending against the restoring force of the FPC substrate 2 for the light source like the spacer 5. As a material of the spacer 7, a plastic material, such as PET, and a metallic material with elasticity can be exemplified.

The spacer 7 and the double-stick tape 15 may be made of a transparent material, and is preferably made of a light shielding material. The spacer 7 having a light shielding material can be made of a plastic material including carbon or the like, for example. The spacer 7 made of the light shielding material interrupts a stray light such as a light which passes through the double-stick tape 6 and a reflected light by other members.

Accordingly, the stray light does not enter a display area of the display panel 1 any more.

An end part 7a of the spacer 7 and an end part 5e of the spacer 5 are located at the same position as shown in FIG. 18. However, in the exemplary embodiment, the end part 7a of the spacer 7 and the end part 5e of the spacer 5 may be located at different positions.

As such an example, a case in which the restoring force of the FPC substrate 2 for the light source acts in a direction vertical to a face of the spacer 7 can be possible. In the case, if a position of the end part 7a of the spacer 7 and a position of the end part 5e of the spacer 5 coincide, the spacer 5 and the spacer 7 work together efficiently. Accordingly, the lift of the FPC substrate 2 for the light source is efficiently suppressed.

On the other hand, when the restoring force of the FPC substrate 2 for the light source includes a component which is not vertical to the face of the spacer 7, it is preferable that the end part 5e of the spacer 5 and the end part 7a of the spacer 7 are located at different positions. As such example, as shown in FIG. 19, the case where the restoring force of the FPC substrate 2 for the light source has the component in the direction of the end face 21 of the protruding part 1e from the end part 7a of the spacer 7 can be considered.

In the case, it is preferable to set the end part 5e of the spacer 5 inside the end part 7a of the spacer 7 (on the left side of the page in FIG. 19).

More preferably, a position of the end part 5e of the spacer 5 or a position of the end part 7a of the spacer 7 is set so that the restoring force of FPC substrate 2 for the light source may have the parallel component to the line which connects the end part 5e of the spacer 5 and the end part 7a of the spacer 7.

Thereby, the spacer 5 and the spacer 7 can works together efficiently. Accordingly, the lift of the FPC substrate 2 for the light source is suppressed.

If an inner end part 7b of the spacer 7 is overlapped with the polarizer 1a, the display panel part 51 and the backlight unit 52 are strongly fixed to each other by the overlapped area. At that time, if the spacer 7 does not block a light which enters the display panel 1 from the light guide plate 11, the overlapped area of the spacer 7 and the polarizer 1a may be set as large as possible.

As described above, the spacer with thickness substantially equal to the polarizer 1a is provided in a position including a position in which the FPC substrate unsticks at least from the fixing member.

The spacer 7 is arranged in an area which lies from the end part of the polarizer 1a to an outer side of the protruding part 1e and between the spacer 5 and the FPC substrate 2 for the light source.

In such a configuration, the double-stick tape fixing the FPC substrate for the light source to the chassis is not unstuck by the force to restore the FPC substrate for the light source to a flat state.

Accordingly, positional displacement of the LED caused by the lift of the FPC substrate for the light source can be prevented. Therefore, the brightness distribution of an incident light in the display panel can become homogeneous, and aging of the brightness distribution can be suppressed. And an image display quality of the display device improves, and aging of the image display quality is reduced.

Next, a display device according to a fourth exemplary embodiment of the present invention will be described with reference to FIG. 20.

In the exemplary embodiments described above, as shown, for example in FIG. 11 and FIG. 12, the extension 5a is the shape which covers FPC substrate 2 for the light sources and projects towards the outside of chassis 4.

Figure 20:
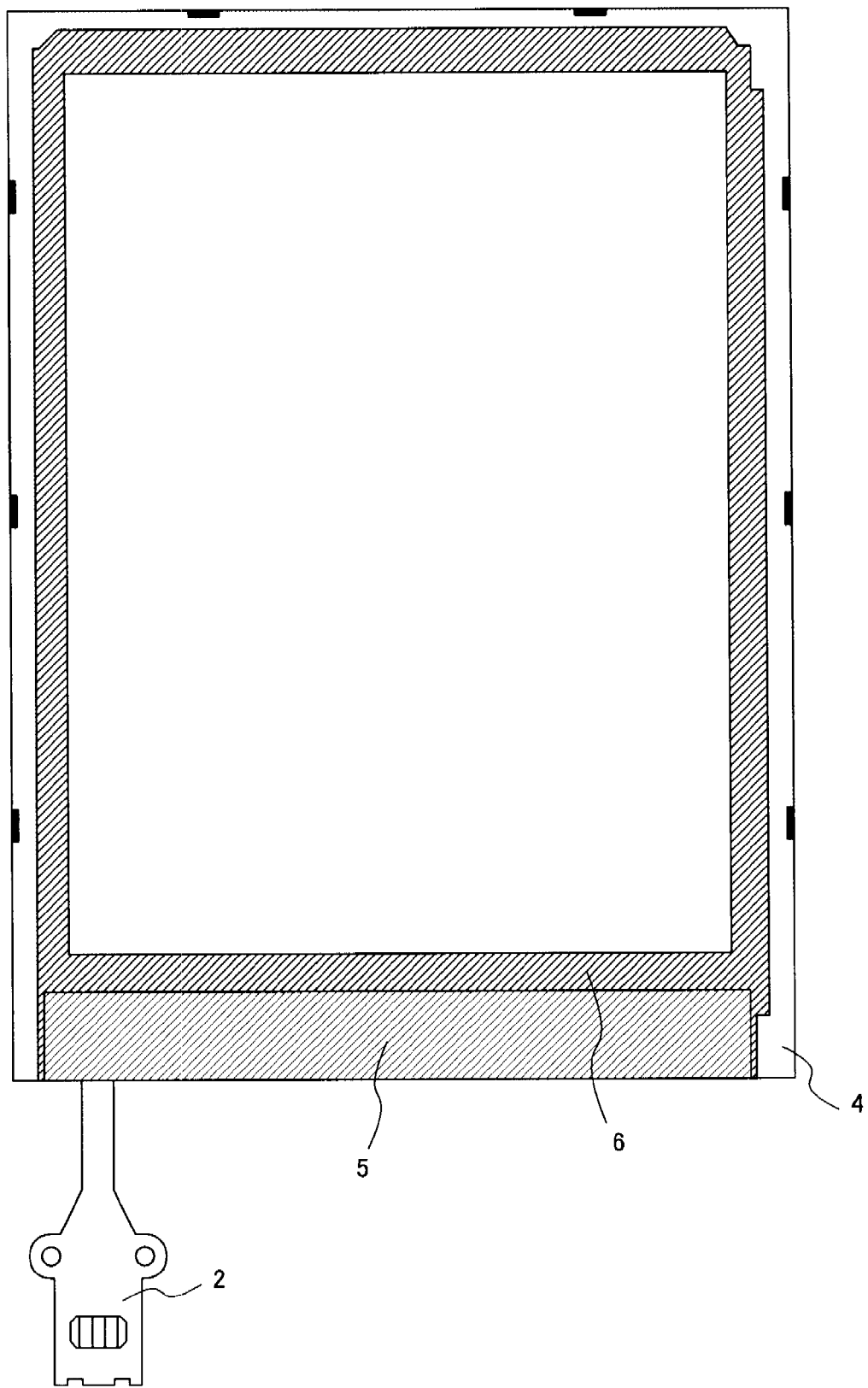
FIG. 20 is a top view of a display device having a spacer arranged in a backlight unit thereof in a fourth exemplary embodiment of the present invention.
Figure 21:
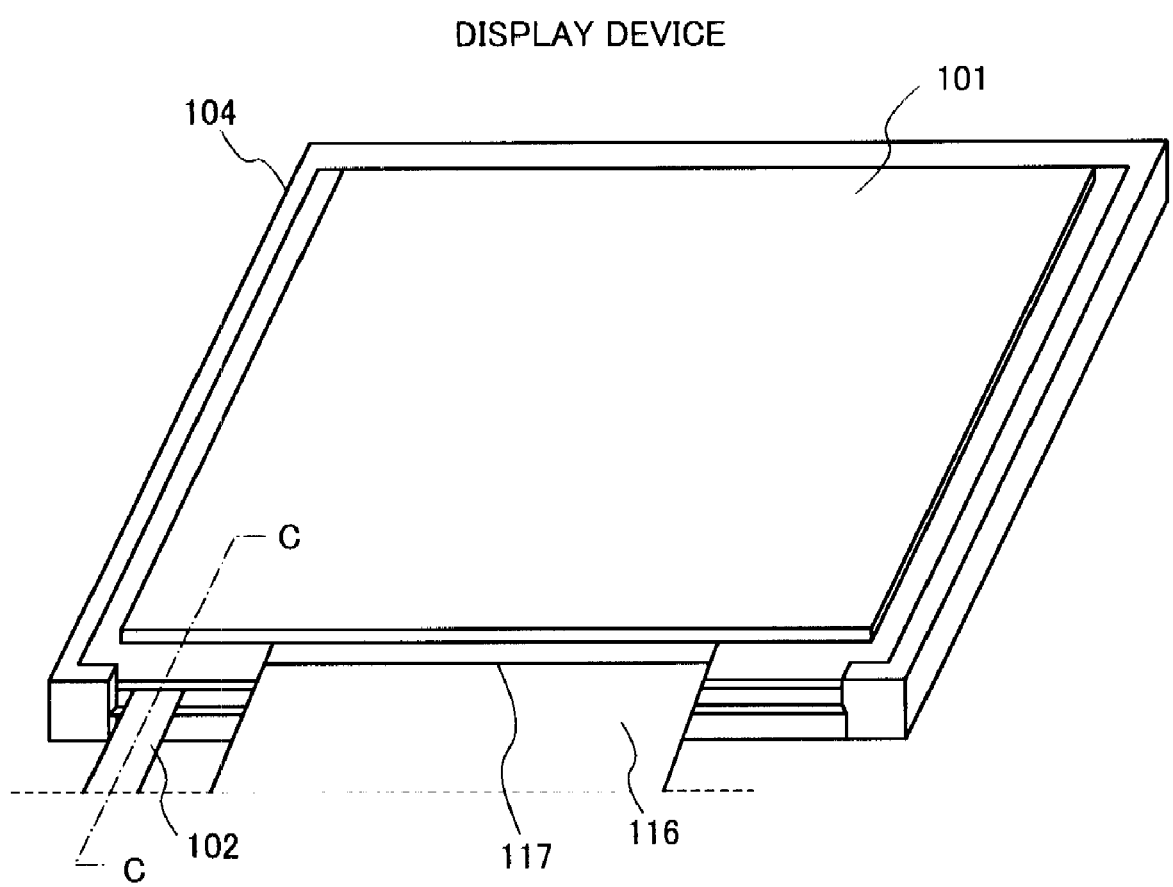
FIG. 21 is a perspective view of a display device in a related art.
Figure 22:
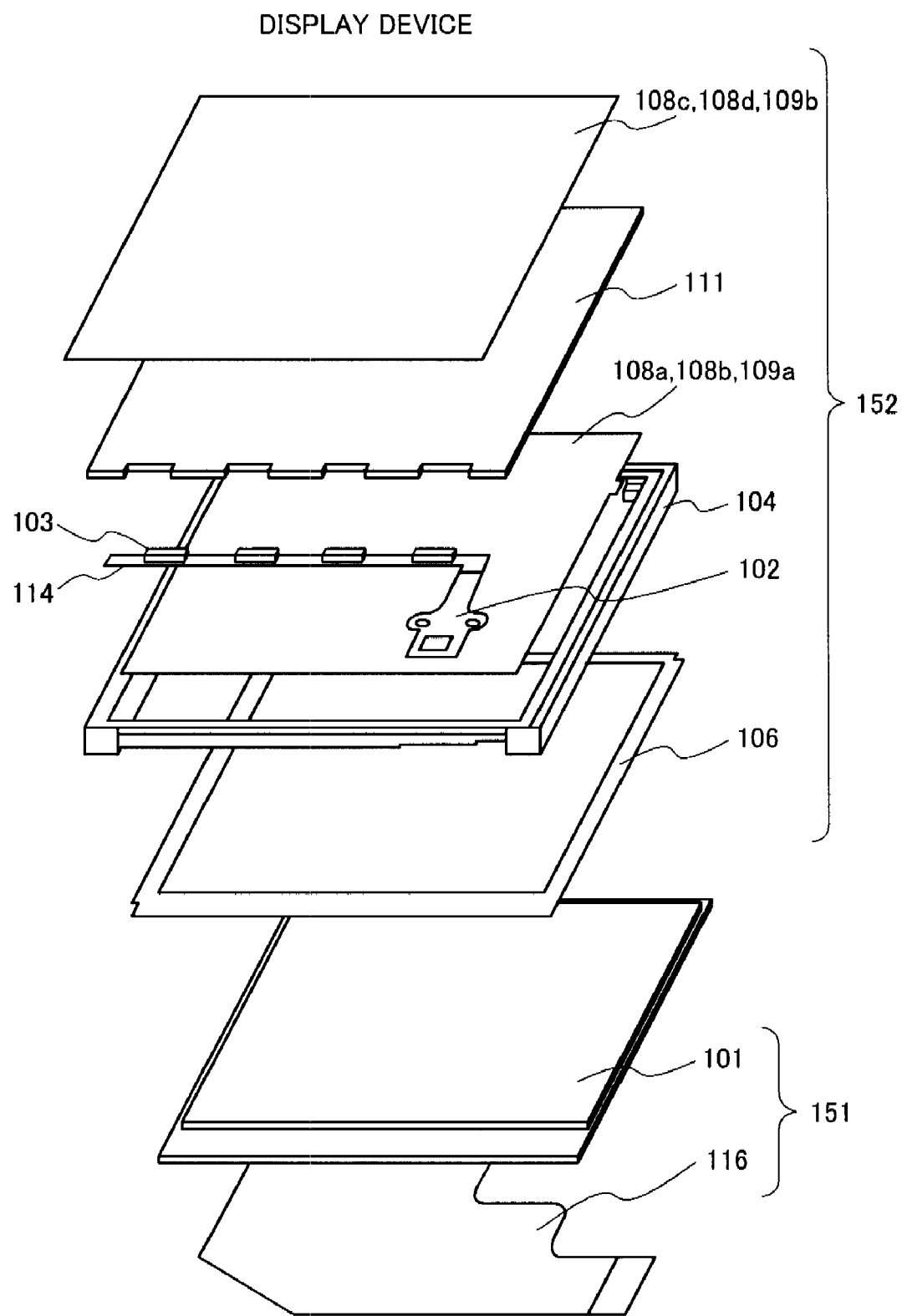
FIG. 22 is an exploded perspective view of the display device in the related art.
Figure 23A:
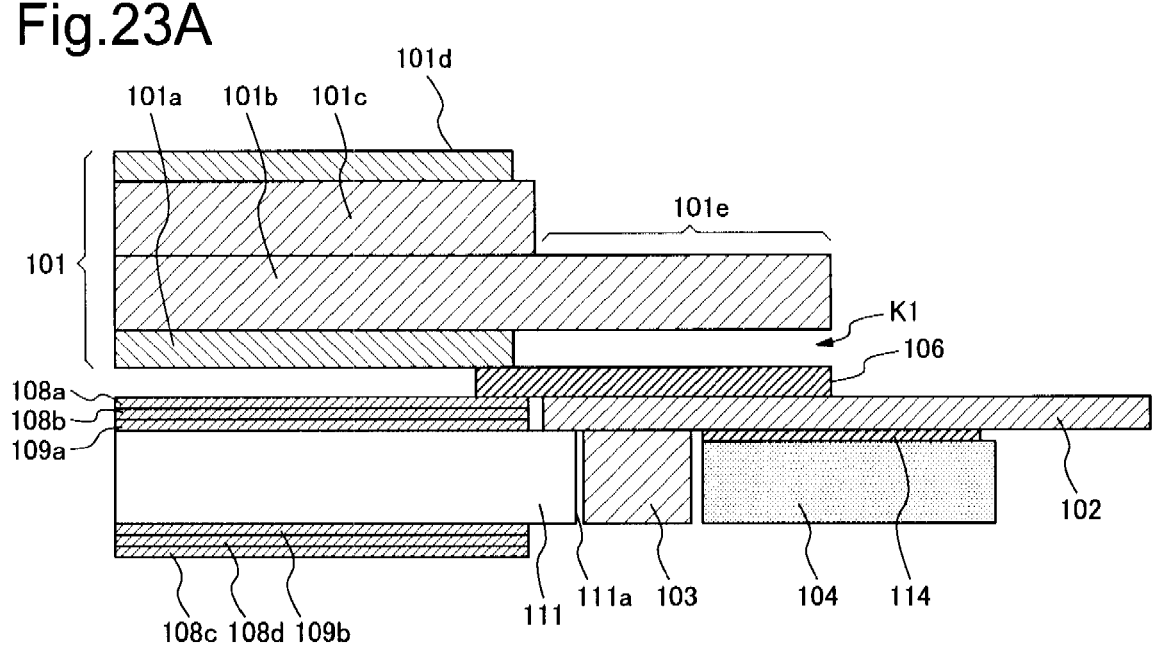
FIG. 23A is a partially sectional view along a C-C line in FIG. 21 in the related art.
Figure 23B:
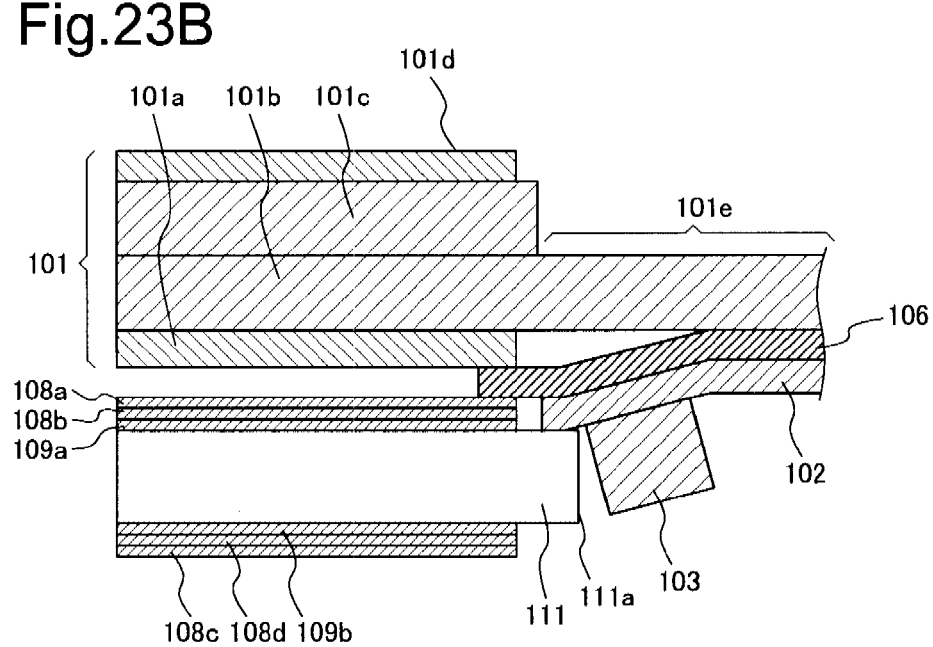
FIG. 23B is a diagram for explaining a disadvantage of the display device in a related art.
Figure 24:
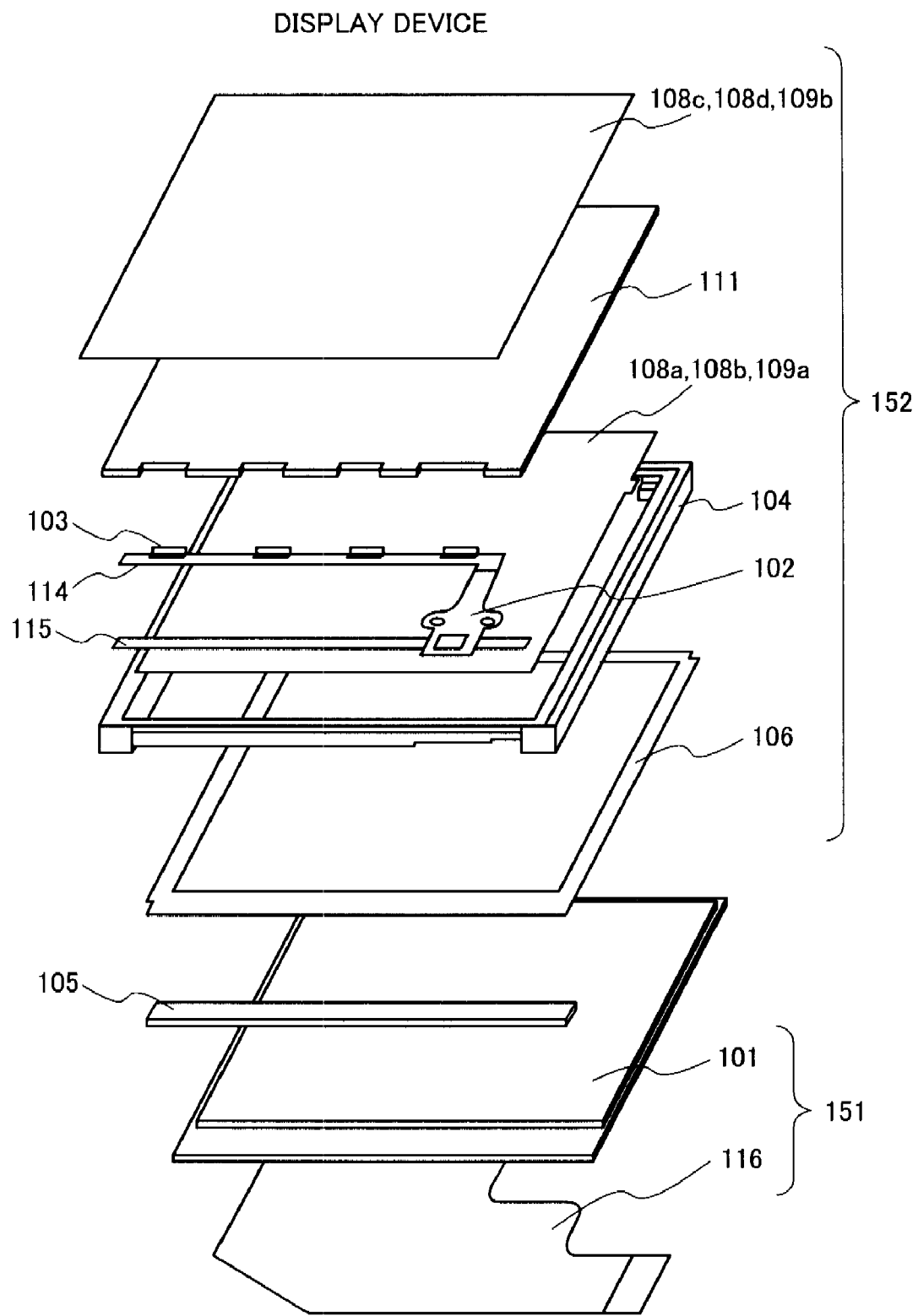
FIG. 24 is an exploded perspective view of the display device in the related art.

On the other hand, in the exemplary embodiment, as shown in FIG. 20, the spacer 5 includes a rectangular shape. FIG. 20 is a top view of a display device concerning the exemplary embodiment in which the rectangular spacer is provided in the backlight unit.

The double-stick tape 6 and the double-stick tape 14 (not shown in FIG. 20) are extended to an end part of the chassis 4 like the spacer 5. When the spacer 7 as shown in FIG. 18 and FIG. 19 is provided, the spacer 7 and the double-stick tape 15 are extended to an end part of the chassis 4 like the spacer 5.

The spacer and the double-stick tape without the projected part can be easily formed compared with the spacer in the previous embodiment. Therefore, reduction of a production cost for the spacer become possible.

As explained above, according to the exemplary embodiment, in addition to the advantages in each exemplary embodiment described above, improvement in workability and a reduction of a production cost for the spacer and the like are obtained.

Each exemplary embodiment described above is an example of exemplary embodiment for describing the present invention. Accordingly, the present invention is not limited to each above-mentioned exemplary embodiment.

For example, regarding components in the display device of the invention, a shape, a structure and an arrangement can be freely modified, and addition of different members is possible. The present invention includes such change and addition.

The LED can be arranged at one end face of the light guide plate or at both end faces facing each other thereof.

Any structure and arrangement about an optical sheet, a reflecting sheet and a polarizer are possible, and a shape and a fitting structure of a casing can be also changed in the present invention.

The present invention is applicable to any display devices provided with a point light source. In addition, not only the LED described in the exemplary embodiments but other light sources, such as laser diodes other than the LED, can be used as a point light source.

A FPC substrate held by the spacer is not limited to the FPC substrate for the light source.

The above-mentioned spacer is applicable to a place where the FPC substrate is likely to unstick.

Any types of switching elements (TFT using an amorphous silicon or a polysilicon as a semiconductor layer) and any structure of switching elements (an inverse stagger structure, a forward stagger structure, for example) are applicable for the LCD device of the invention.

Any drive systems (an In Plane Switching system, a Twisted Nematic system, a Vertical Alignment system, etc.) of an LCD device are applicable for the LCD device of the invention.

Next, a fifth exemplary embodiment of the invention is explained. The display device includes the display panel part and the backlight unit. The display panel part includes the glass substrate and the polarizer arranged on a face of the glass substrate facing the backlight unit. The glass substrate includes the protruding part of which one side protrudes from the polarizer.

The backlight unit includes the light guide plate facing the glass substrate and the light source arranged on the end face of the protruding part of the light guide plate. The backlight unit further includes a casing to cover the light guide plate and the light source from the outer side, and the FPC substrate for the light source fixed with the double-stick tape to the face facing the display panel part of the casing on which the light source is mounted.

The FPC substrate for the light source is bent toward the back face of the casing through the side part thereof. In an area outside the polarizer where includes at least the end part of the protruding part, the spacer with the thickness substantially equal to that of the polarizer is arranged.

The end part of the polarizer and the spacer are fixed to the FPC substrate for the light source with the light shielding double-stick tape.

The present invention can be applicable for a display device and an apparatus using the same, and the present invention can be particularly applicable for a display device having a lighting device of a backlight unit using a point light source, and a portable device provided with the display device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A display device including a display panel which displays an image and a backlight unit which illuminates a light to said display panel, comprising:
   said backlight unit with a fixing member fixed on a device casing;
   a flexible printed circuit substrate which is fixed on said fixing member; and
   a spacer which is fixed on said flexible printed circuit substrate, wherein
   said flexible printed circuit substrate in an end part of said display panel is sandwiched between said fixing member and said spacer, and
   said flexible printed circuit substrate is fixed to said fixing member with first double-stick tape.

2. A display device according to claim 1, wherein a polarizer which is adjacent to said spacer and having substantially the same thickness as said spacer.

3. A display device according to claim 1, wherein a light source is mounted on said flexible printed circuit substrate.

4. A display device according to claim 1, wherein said spacer is a laminated member formed by stacking a plurality of plates.

5. A display device according to claim 4, wherein a thermal expansion coefficient of said plate which is arranged at least at the nearest position to said flexible printed circuit substrate is smaller than that of other plates in said plurality of plates.

6. A display device according to claim 1, wherein end parts of both said spacer and said fixing member are located substantially at the same position.

7. A display device according to claim 1, wherein an optical substrate is arranged upper said spacer, and wherein said spacer includes a stepped portion so that said spacer fits in a corner portion of said optical substrate.

8. A display device according to claim 1, wherein said spacer holds said flexible printed circuit substrate by a force larger than a restoring force of said flexible printed circuit substrate.

9. A display device according to claim 1, wherein said spacer includes at least a first spacer, a second spacer, and a third double-stick tape with which said first spacer and said second spacer are fixed.

10. A display device according to claim 9, wherein said third double-stick tape includes light shielding properties.

11. A display device according to claim 9, wherein end parts of both said first spacer and said second spacer are located substantially at the same position.

12. A display device according to claim 9, wherein an end part of said second spacer is located outside an end part of said first spacer.

13. A display device according to claim 1, wherein said flexible printed circuit substrate is bent so as to cover said fixing member.

14. A display device including a display panel which displays an image and a backlight unit which illuminates a light to said display panel, comprising:
   said backlight unit with a fixing member fixed on a device casing;
   a flexible printed circuit substrate which is fixed on said fixing member; and
   a spacer which is fixed on said flexible printed circuit substrate,
   wherein said flexible printed circuit substrate in an end part of said display panel is sandwiched between said fixing member and said spacer,
   wherein said spacer is fixed to said flexible printed circuit substrate with a double-stick tape,
   wherein said double-stick tape includes light shielding properties.

15. A display device comprising:
a display panel configured to display an image;
a flexible printed circuit substrate configured to be fixed on a fixing member;
a backlight unit configured to illuminate a light to said display panel, wherein said backlight unit is fixed to said fixing member via said flexible printed circuit; and
a spacer configured to be fixed between an end part of said flexible printed circuit substrate and an end part of said display panel,
wherein an end of said spacer is located beyond an end part of said display panel.

16. The display device according to claim 15, wherein said spacer is fixed to said flexible printed circuit substrate with a double-stick tape which includes light shielding properties.

17. The display device according to claim 15, wherein said spacer is a laminated member comprising a stack of a plurality of plates.

18. The display device according to claim 17, wherein a thermal expansion coefficient of the plate of the plurality of plates which is arranged at least at the nearest position to said flexible printed circuit substrate is smaller than that of other plates in said plurality of plates.

19. The display device according to claim 15, wherein said spacer holds said flexible printed circuit substrate by a force larger than a restoring force of said flexible printed circuit substrate.

* * * * *